United States Patent
Lee et al.

(10) Patent No.: US 10,181,723 B2
(45) Date of Patent: Jan. 15, 2019

(54) CIRCUITS AND METHODS TO SELECTIVELY SWITCH POWER SIGNAL GENERATOR INPUTS TO A LOAD

(71) Applicant: Samsung Electronics Co., Ltd., Suwon-si, Gyeonggi-do (KR)

(72) Inventors: Woo-Sung Lee, Seoul (KR); Chung-Hyun Ryu, Hwasung-si (KR); Sang-Hun Jeon, Yongin-si (KR); Jae-Woong Choi, Yongin-si (KR); Sang-Sik Heo, Jinju-si (KR)

(73) Assignee: Samsung Electronics Co., Ltd. (KR)

( * ) Notice: Subject to any disclaimer, the term of this patent is extended or adjusted under 35 U.S.C. 154(b) by 285 days.

(21) Appl. No.: 15/190,397

(22) Filed: Jun. 23, 2016

(65) Prior Publication Data
US 2017/0063082 A1    Mar. 2, 2017

(30) Foreign Application Priority Data
Sep. 2, 2015    (KR) .......... 10-2015-0123984

(51) Int. Cl.
| H02J 1/10 | (2006.01) |
| H02J 7/34 | (2006.01) |
| G05F 1/10 | (2006.01) |
| H02M 1/10 | (2006.01) |

(52) U.S. Cl.
CPC ............ *H02J 1/10* (2013.01); *G05F 1/10* (2013.01); *H02J 7/34* (2013.01); *H02M 1/10* (2013.01)

(58) Field of Classification Search
CPC .... H02J 1/10; H02J 7/34; H02J 7/0055; H02J 3/38; Y10T 307/576; Y10T 307/305; Y10T 307/391; G05F 1/10; H02M 1/10
See application file for complete search history.

(56) References Cited

U.S. PATENT DOCUMENTS

| 3,745,366 | A | 7/1973 | Simon |
| 6,320,732 | B1 | 11/2001 | Norman et al. |
| 6,420,906 | B1 * | 7/2002 | Kohda ............... H02J 9/061 326/113 |
| 7,205,681 | B2 * | 4/2007 | Nguyen .............. H02J 1/10 307/18 |
| 7,466,573 | B2 * | 12/2008 | Kojori ............... H02J 1/10 323/271 |
| 7,646,116 | B2 | 1/2010 | Batarseh et al. |

(Continued)

FOREIGN PATENT DOCUMENTS

| JP | 2015-023766 A | 2/2015 |
| KR | 10-0660938 B1 | 12/2006 |
| KR | 10-1211987 B | 12/2012 |

*Primary Examiner* — Rexford Barnie
*Assistant Examiner* — Rasem Mourad
(74) *Attorney, Agent, or Firm* — Ward and Smith, P.A.

(57) ABSTRACT

Methods of operating a power supply switching circuit including selecting a first power supply signal for provisioning through the power supply switching circuit to a electronic storage device. A current draw can be detected via the first power supply signal that exceeds a predetermined current limit and a second power supply signal can be coupled to the first power supply signal for provisioning through the power supply switching circuit to the electronic storage device responsive to the current draw exceeding the predetermined current limit.

12 Claims, 19 Drawing Sheets

(56) References Cited

U.S. PATENT DOCUMENTS

| | | | |
|---|---|---|---|
| 7,960,861 B2* | 6/2011 | Gscheidle | H02J 1/108 |
| | | | 307/43 |
| 8,310,094 B2 | 11/2012 | Yamada et al. | |
| 8,330,294 B2* | 12/2012 | Nishigata | G06F 1/263 |
| | | | 307/130 |
| 8,803,486 B2 | 8/2014 | Norimatsu et al. | |
| 8,853,888 B2 | 10/2014 | Khaligh | |
| 2004/0202900 A1 | 10/2004 | Pavio et al. | |
| 2013/0059220 A1 | 3/2013 | Kim et al. | |
| 2013/0320769 A1* | 12/2013 | Sawyers | G06F 1/263 |
| | | | 307/80 |
| 2014/0159506 A1 | 6/2014 | Kim et al. | |
| 2015/0076909 A1 | 3/2015 | Biederman et al. | |

* cited by examiner

CIRCUITS AND METHODS TO SELECTIVELY SWITCH POWER SIGNAL GENERATOR INPUTS TO A LOAD

CROSS-REFERENCE TO RELATED APPLICATION

This U.S. Non-provisional application claims priority under 35 USC § 119 to Korean Patent Application No. 10-2015-0123984, filed on Sep. 2, 2015, in the Korean Intellectual Property Office (KIPO), the disclosure of which is incorporated by reference in its entirety herein.

FIELD

Example embodiments relate generally to power circuits, and more particularly to power circuits using a plurality of power sources having different voltages.

BACKGROUND

A solid state drive (SSD) may use a plurality of voltages (for example, 12[V], 5[V] and 3.3[V]) as input voltages. Some conventional SSDs use one of the plurality of voltages. Some conventional SSDs use two or more voltages of the plurality of voltages.

SUMMARY

Embodiments according to the inventive concept can provide methods of operating a power supply switching circuit including selecting a first power supply signal for provisioning through the power supply switching circuit to a electronic storage device. A current draw can be detected via the first power supply signal that exceeds a predetermined current limit and a second power supply signal can be coupled to the first power supply signal for provisioning through the power supply switching circuit to the electronic storage device responsive to the current draw exceeding the predetermined current limit.

Embodiments according to the inventive concept can provide a power circuit that includes a first power signal generator configured to generate a first input power signal having a first input voltage. A second power signal generator can be configured to generate a second input power signal having a second input voltage whose level is less than a level of the first input voltage. A regulator can be configured to generate a first internal power signal based on the first input voltage, the first internal power signal having a first internal current and a first internal voltage that is greater than the second input voltage by an offset voltage. A current clamper can be configured to clamp the first internal power signal based on a limited current amount and configured to generate a second internal power signal having a second internal voltage and a second internal current and a switch circuit can be configured to output one of the second internal power signal and a sum of the second input power signal and the second internal power signal as an output power signal, based on a difference between the second internal voltage and the second input voltage.

Embodiments according to the inventive concept can a power circuit that includes a first signal generator configured to generate a first input power signal having a first input voltage. A second signal generator can be configured to generate a second input power signal having a second input voltage whose level is less than a level of the first input voltage. A regulator can be configured to generate a first internal power signal based on the first input voltage, the first internal power signal having a first internal current and a first internal voltage that is greater than the second input voltage by an offset voltage and a current clamper can be configured to clamp the first internal power signal based on a limited current amount and configured to generate a second internal power signal having a second internal voltage and a second internal current. A switch circuit can be configured to output one of the second internal power signal and a sum of the second input power signal and the second internal power signal as an output power signal, based on a difference between the first internal voltage and the second internal voltage.

Some example embodiments are directed to provide a power circuit capable of generating sufficient power signal by changing a route through which a power is supplied based on amount of load current.

According to some example embodiments, a power circuit includes a first power signal generator, a second power signal generator, a regulator, a clamper and a switch circuit. The first power signal generator generates a first input power signal having a first input voltage. The second power signal generator generates a second input power signal having a second input voltage whose level is smaller than a level of the first input voltage. The regulator generates a first internal power signal based on the first input voltage and the first internal power signal has a first internal voltage greater than the second input voltage by an offset voltage and a first internal current. The clamper clamps the first internal power signal based on a limited current amount and generates a second internal power signal having a second internal voltage and a second internal current. The switch circuit outputs one of the second internal power signal and a sum of the second input power signal and the second internal power signal as an output power signal, based on a difference between the second internal voltage and the second input voltage.

In example embodiments, when the level of the second input voltage is smaller than a level of the second internal voltage, the switch circuit may output the second internal power signal as the output power signal. When the level of the second input voltage is equal to or greater than the level of the second internal voltage, the switch circuit may output the sum of the second input power signal and the second internal power signal as the output power signal.

In example embodiments, when the level of the second input voltage is smaller than a level of a sum of the second internal voltage and a threshold voltage, the switch circuit may output the second internal power signal as the output power signal. When the level of the second input voltage is equal to or greater than the level of the sum of the second internal voltage and the threshold voltage, the switch circuit may output sum of the second input power signal and the second internal power signal as the output power signal.

In example embodiments, the limited current amount is adjusted by a limited current adjusting signal.

In example embodiments, when a magnitude of the first internal current is smaller than the limited current amount, the clamper may generate the second internal current whose magnitude is same as the magnitude of the first internal current and the second internal voltage whose level is same as the level of the first internal voltage. When the magnitude of the first internal current is equal to or greater than the limited current amount, the clamper may generate the second internal current whose magnitude is same as the limited current amount and the second internal voltage whose level is smaller than the level of the first internal voltage.

When the magnitude of the first internal current may be equal to or greater than the limited current amount, the level of the second internal voltage may decrease as the magnitude of the first internal current increases.

In example embodiments, the regulator may include an operational amplifier, a power transistor and first through fourth resistors. The first resistor may have a first terminal receiving the second input voltage and a second terminal connected to a first node. The second resistor may have a first terminal connected to the first node and a second terminal connected to a ground voltage. The operational amplifier may have a first input terminal connected to the first node, a second input terminal connected to a second node and an output terminal connected to a third node. The power transistor may have a source connected to the first input voltage, a gate connected to the third node and a drain connected to the third resistor. The third resistor may have a first terminal connected to the power transistor and a second terminal connected to the second node. The fourth resistor may have a first terminal connected to the second node and a second terminal connected to the ground voltage. The first internal voltage may be a voltage of the second node and the first internal current may be output from the second node.

In example embodiments, the clamper may include a first p-channel metal-oxide semiconductor (PMOS) transistor, a second PMOS transistor, a sensing resistor, a protection resistor and a variable resistor. The first internal voltage may be a voltage of a first node and the first internal current may be input to the first node. The first PMOS transistor may have a source connected to the first node, a gate connected to a second node and a drain connected to a third node. The sensing resistor may have a first terminal connected to the first node and a second terminal connected to a fourth node. The protection resistor may have a first terminal connected to the second node and a second terminal connected to the fourth node. The variable resistor may have a first terminal connected to the third node and a second terminal connected to a ground voltage. The second PMOS transistor may have a source connected to the fourth node, a gate connected to the third node and a drain connected to a fifth node. The second internal voltage may be a voltage of the fifth node and the second internal current is output from the fifth node.

A resistance of the variable resistor may be varied by a limited current adjusting signal.

The clamper may further include a resistance controller. The resistance controller may store a limited current adjusting signal and may adjust a resistance of the variable resistor based on the limited current adjusting signal.

In example embodiments, the switch circuit may include a diode. The diode may have a cathode connected to a first node and an anode connected to a second node. The second internal voltage may be a voltage of the second node and the second internal current may be input to the second node. The second input voltage may be a voltage of the first node and a second input current of the second input power signal may be input to the first node. An output voltage of the output power signal may be a voltage of the second node and an output current of the output power signal may be output from the second node.

The switch circuit may include an operational amplifier and an adjusting transistor. The operational amplifier may have a first input terminal connected to a first node, a second input terminal connected to a second node and an output terminal connected to a third node. The adjusting transistor may have a drain connected to the second node, a gate connected to the third node and a source connected to the first node. The second internal voltage may be a voltage of the second node and the second internal current may be input to the second node. The second input voltage may be a voltage of the first node and a second input current of the second input power signal may be input to the first node. An output voltage of the output power signal may be a voltage of the second node and an output current of the output power signal may be output from the second node.

According to some example embodiments, a power circuit includes a first power signal generator, a second power signal generator, a regulator, a clamper and a switch circuit. The first power signal generator generates a first input power signal having a first input voltage. The second power signal generator generates a second input power signal having a second input voltage whose level is smaller than a level of the first input voltage. The regulator generates a first internal power signal based on the first input voltage and the first internal power signal has a first internal voltage greater than the second input voltage by an offset voltage and a first internal current. The clamper clamps the first internal power signal based on a limited current amount and generates a second internal power signal having a second internal voltage and a second internal current. The switch circuit outputs one of the second internal power signal and a sum of the second input power signal and the second internal power signal as an output power signal, based on a difference between the first internal voltage and the second internal voltage.

In example embodiments, when the level of the first internal voltage is smaller than a level of the second internal voltage, the switch circuit may output the second internal power signal as the output power signal. When the level of the first internal voltage is equal to or greater than the level of the second internal voltage, the switch circuit may output the sum of the second input power signal and the second internal power signal as the output power signal.

In example embodiments, when the level of the first internal voltage is smaller than a level of a sum of the second internal voltage and a threshold voltage, the switch circuit may output the second internal power signal as the output power signal. When the level of the first internal voltage is equal to or greater than the level of the sum of the second internal voltage and the threshold voltage, the switch circuit may output sum of the second input power signal and the second internal power signal as the output power signal.

Accordingly, the power circuit may generate sufficient power signal by changing a route through which a power is supplied from a plurality of power sources, based on amount of load current while preventing heating phenomenon due to overcurrent.

BRIEF DESCRIPTION OF THE DRAWINGS

Illustrative, non-limiting example embodiments will be more clearly understood from the following detailed description in conjunction with the accompanying drawings.

DETAILED DESCRIPTION OF EMBODIMENTS

Figure 1:
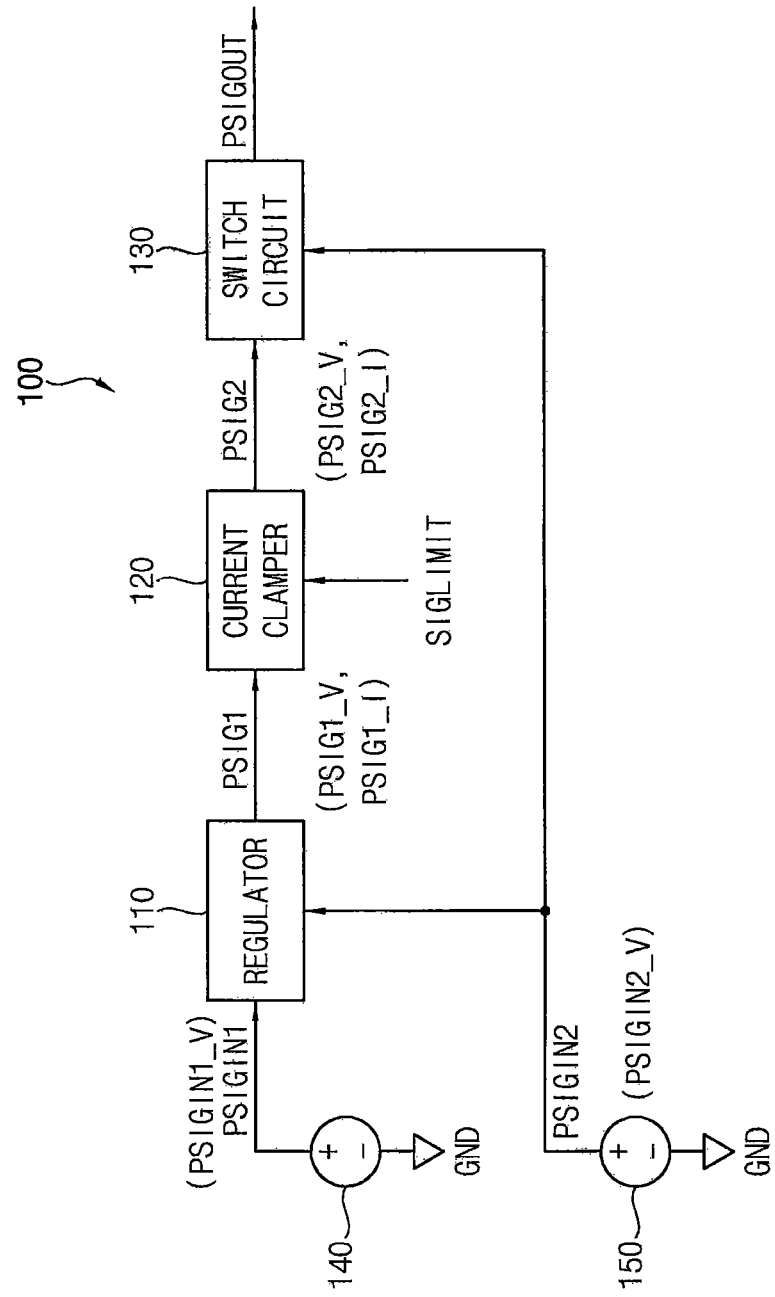
FIG. 1 is a block diagram illustrating a power circuit according to example embodiments.

Various example embodiments will be described more fully hereinafter with reference to the accompanying drawings, in which some example embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a power circuit according to example embodiments.

Referring to FIG. 1, a power circuit 100 includes a first power signal generator 140, a second power signal generator 150, a regulator 110, a current clamper 120 and a switch circuit 130. It will be understood that each of the elements shown in FIG. 1 can be separate circuits or integrated with one another or in any combination with one another.

The first power signal generator 140 generates a first input power signal PSIGIN1 having a first input voltage PSIGIN1_V. The second power signal generator 150 generates a second input power signal PSIGIN2 having a second input voltage PSIGIN2_V whose level is less than a level of the first input voltage PSIGIN1_V.

The regulator 110 generates a first internal power signal PSIG1 based on the first input voltage. The first internal power signal PSIG1 may have a first internal current PSIG1_I and a first internal voltage PSIG1_V whose level is greater than the second input voltage PSIGIN2_V by an offset voltage. The current clamper 120 clamps the first internal power signal PSIG1 based on a limited current amount and generates a second internal power signal PSIG2 having a second internal voltage PSIG2_V and a second internal current PSIG2_I. The switch circuit 130 outputs the second internal power signal PSIG2 or a sum of the second input power signal PSIGIN2 and the second internal power signal PSIG2 as an output power signal PSIGOUT, based on a difference between the second internal voltage PSIG2_V and the second input voltage PSIGIN2_V.

The current clamper 120 clamps based on the limited current amount which can be adjusted using a limited current adjusting signal SIGLIMIT. In some embodiments, when a magnitude of the first internal current PSIG1_I is less than the limited current amount, the current clamper 120 may generate the second internal current PSIG2_I to be the same as the first internal current PSIG1_I and the second internal voltage PSIG2_V to have the same level as the first internal voltage PSIG1_V. When, however, the magnitude of the first internal current PSIG1_I is equal to or greater than the limited current amount, the current clamper 120 may generate the second internal current PSIG2_I to have the same magnitude as that specified by the limited current amount and the second internal voltage PSIG2_V to have a level that is not less than the level of the first internal voltage PSIG1_V. The current clamper 120 is also described with reference to FIGS. 5A and 5B.

In some embodiments, when the level of the second input voltage PSIGIN2_V is less than the level of the second internal voltage PSIG2_V, the switch circuit 130 may output the second internal power signal PSIG2 as the output power signal PSIGOUT. When, however, the level of the second input voltage PSIGIN2_V is equal to or greater than the level of the second internal voltage PSIG2_V, the switch circuit 130 may output the sum of the second input power signal PSIGIN2 and the second internal power signal PSIG2 as the output power signal PSIGOUT.

In some embodiments, when the level of the second input voltage PSIGIN2_V is less than the level of the sum of the second internal voltage PSIG2_V and a threshold voltage, the switch circuit 130 may output the second internal power signal PSIG2 as the output power signal PSIGOUT. When, however, the level of the second input voltage PSIGIN2_V is equal to or greater than the level of the sum of the second internal voltage PSIG2_V and the threshold voltage, the switch circuit 130 may output sum of the second input power signal PSIGIN2 and the second internal power signal PSIG2 as the output power signal PSIGOUT.

In some embodiments, the first power signal generator 140 and the second power signal generator 150 may not be included in the power circuit 100.

Figure 2A:
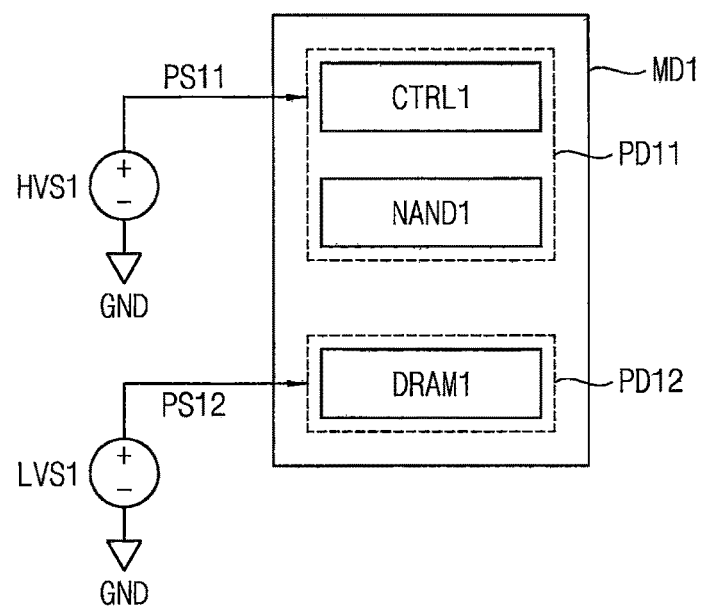
FIGS. 2A and 2B are diagrams illustrating power systems using a plurality of powers.
Figure 2B:
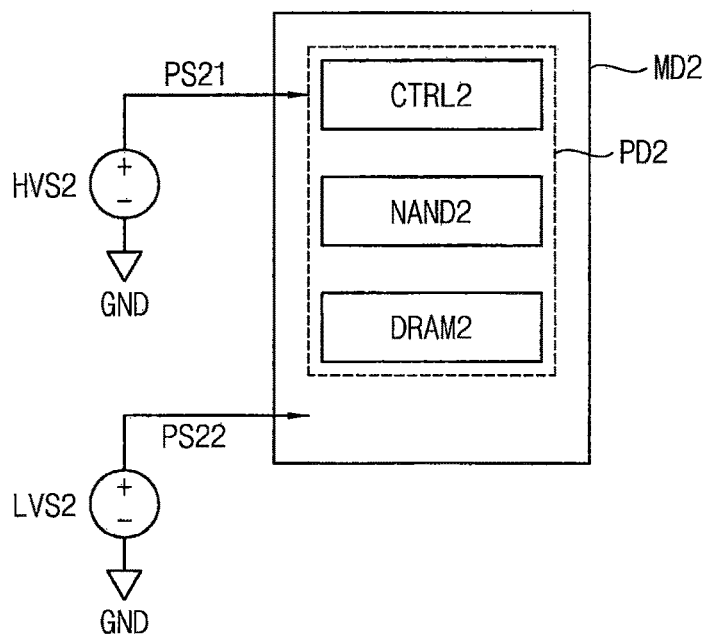

FIGS. 2A and 2B are diagrams illustrating power systems using a plurality of powers.

FIG. 2A illustrates that a memory system MD1 is designed to include a first power domain PD11 and a second power domain PD12. A controller CTRL1 and a NAND flash memory device NAND1 operate in the first power domain PD11. A volatile memory device DRAM1 operates in the second power domain PD12.

When a high voltage power source HVS1 supplies a first power signal PS11 to the first power domain PD11 sufficiently and a low voltage power source LVS1 supplies a second power signal PS12 to the second power domain PD12 sufficiently, the memory system MD1 operates normally. However, when either the high voltage power source HVS1 or the low voltage power source LVS1 does not supply a sufficient power signal, the memory system MD1 may not operate normally.

In a general personal computer, at least one of the high voltage power source HVS1 and the low voltage power source LVS1 are mounted on a main board and the memory system MD1 is mounted on the main board. Since the memory system MD1 draws power from the main board, the personal computer may not operate normally when the power from the high voltage power source HVS1 or the low voltage power source LVS1 is not sufficient.

FIG. 2B illustrates that a memory system MD2 is designed to include one power domain PD2. A controller CTRL2, a NAND flash memory device NAND2 and a volatile memory device DRAM2 operate in the power domain PD2.

When a high voltage power source HVS2 supplies a first power signal PS21 to the first power domain PD11 sufficiently, the memory system MD2 operates normally. However, when a fixed amount of power is assigned to the high voltage power source HVS2 and the low voltage power source LVS2, and a constant amount of power is assigned to the low voltage power source LVS2 that supplies a second power signal PS22, the memory system MD2 may not operate normally if the high voltage power source HVS2 outputs the first power signal PS21 insufficiently.

Figure 3:
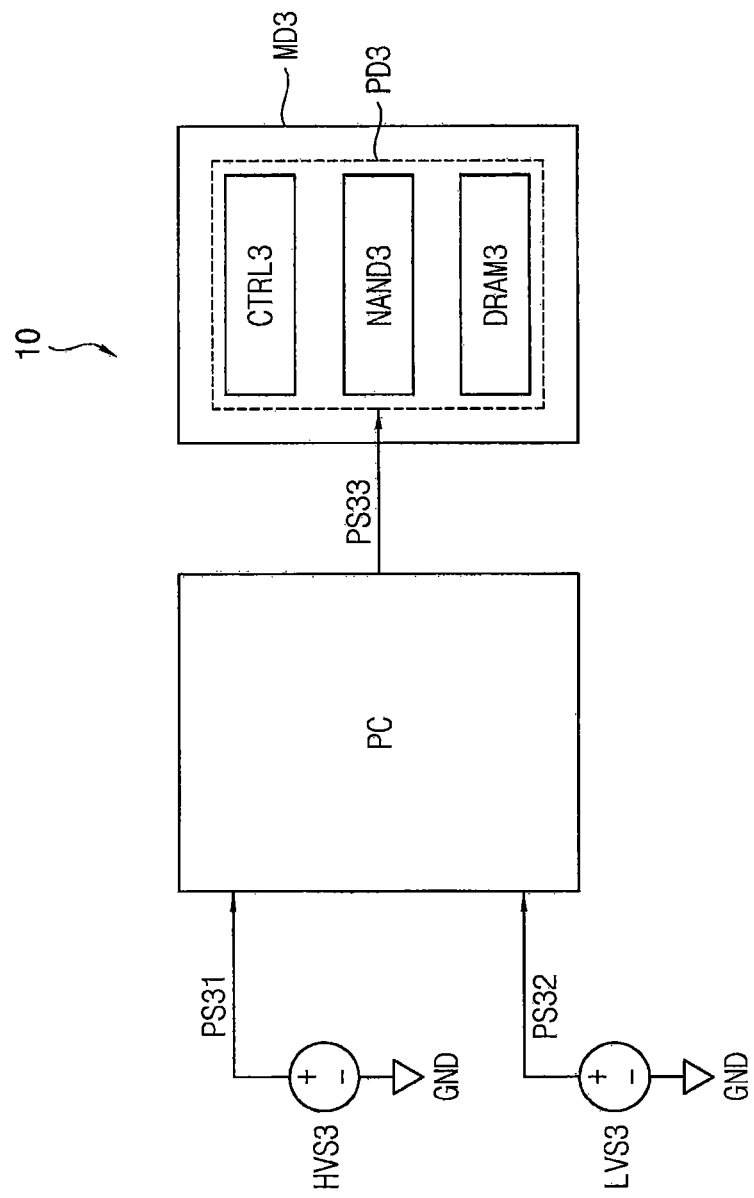
FIG. 3 is a block diagram illustrating a power system including the power circuit of FIG. 1 according to example embodiments.

FIG. 3 is a block diagram illustrating a power system including the power circuit of FIG. 1 according to example embodiments.

Referring to FIG. 3, a power system 10 includes a high voltage power source HVS3, a low voltage power source LVS3, a power circuit PC and a memory system MD3. The power circuit PC may include the regulator 110, the current clamper 120 and the switch circuit 130 in FIG. 1. The memory system MD3 is configured to have one power domain PD3 and a controller CTRL3, a NAND flash memory device NAND3 and a volatile memory device DRAM3 each which operate in the power domain PD3.

The power circuit PC can be configured to selectively sum a first power signal PS31 generated by the high voltage power source HVS3 and a second power signal PS32 generated by the low voltage power source LVS3 according to a power amount required by the memory system MD3, and configured to generate a third power signal PS33 having a sufficient power and may provide the third power signal PS33 to the power domain PD3. Therefore, the memory system MD3 needs not to be modified in view of the powers provided by the high voltage power source HVS3 and the low voltage power source LVS3.

Figure 4:
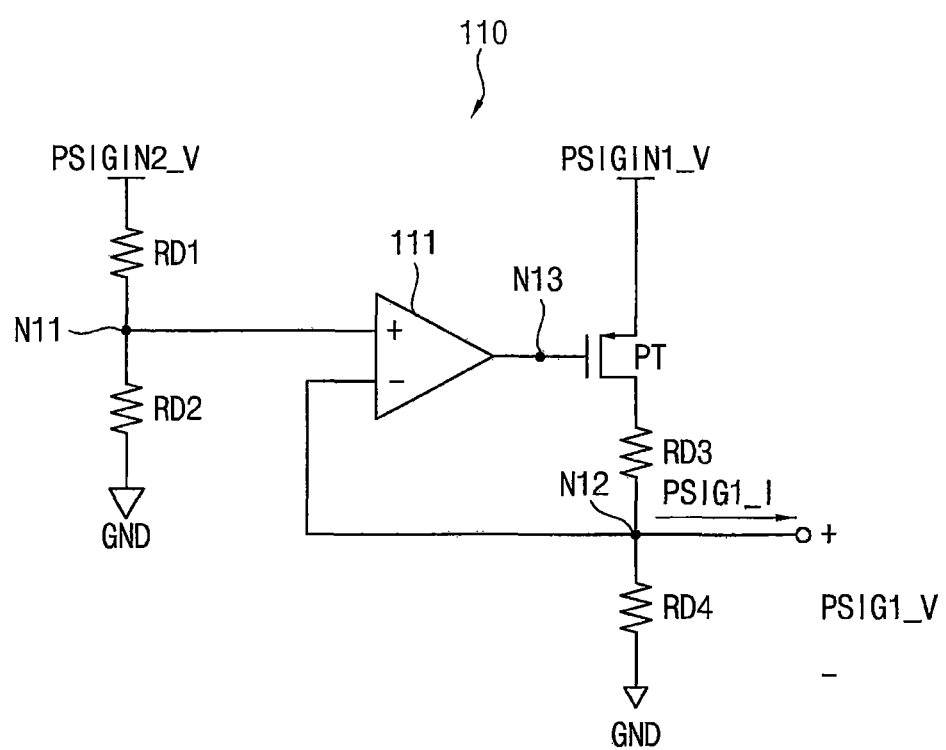
FIG. 4 is a circuit diagram illustrating the regulator in the power circuit of FIG. 1 according to example embodiments.

FIG. 4 is a circuit diagram illustrating the regulator 110 in the power circuit of FIG. 1 according to example embodiments.

Referring to FIG. 4, the regulator 110 may include an operational amplifier 111, a power transistor PT and first through fourth resistors RD1, RD2, RD3 and RD4.

The first resistor RD1 has a first terminal connected to the second input voltage PSIGIN2_V and a second terminal connected to a first node N11. The second resistor RD2 has a first terminal connected to the first node N11 and a second terminal connected to a ground voltage GND. The operational amplifier 111 has a first (positive) input terminal connected to the first node N11, a second (negative) input terminal connected to a second node N12 and an output terminal connected to a third node N13. The power transistor PT has a source connected to the first input voltage PSIGIN1_V, a gate connected to the third node N13 and a drain connected to the third resistor RD3. The third resistor RD3 has a first terminal connected to the power transistor PT and a second terminal connected to the second node N12. The fourth resistor RD4 has a first terminal connected to the second node N12 and a second terminal connected to the ground voltage GND. The first internal voltage PSIG1_V is a voltage of the second node N12, and the first internal current PSIG1_I is output from the second node N12.

The level of first internal voltage PSIG1_V is adjusted to be greater than the level of the second input voltage PSIGIN2_V by the offset voltage by adjusting resistances of the first through fourth resistors RD1, RD2, RD3 and RD4.

The offset voltage may be in a range of 0 through few volts. In some embodiments, the offset voltage may be in a range of 0.2 through 0.3 volts.

Figure 5A:
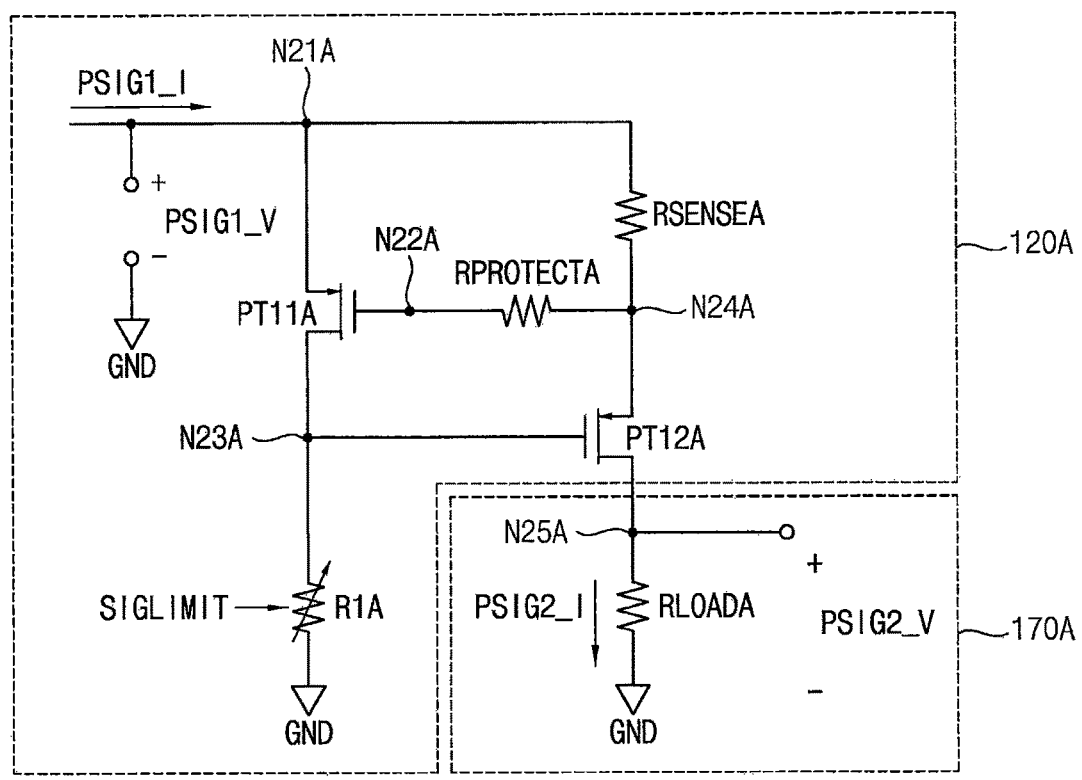
FIGS. 5A and 5B are circuit diagrams illustrating examples of the clamper in the power circuit according to example embodiments.
Figure 5B:
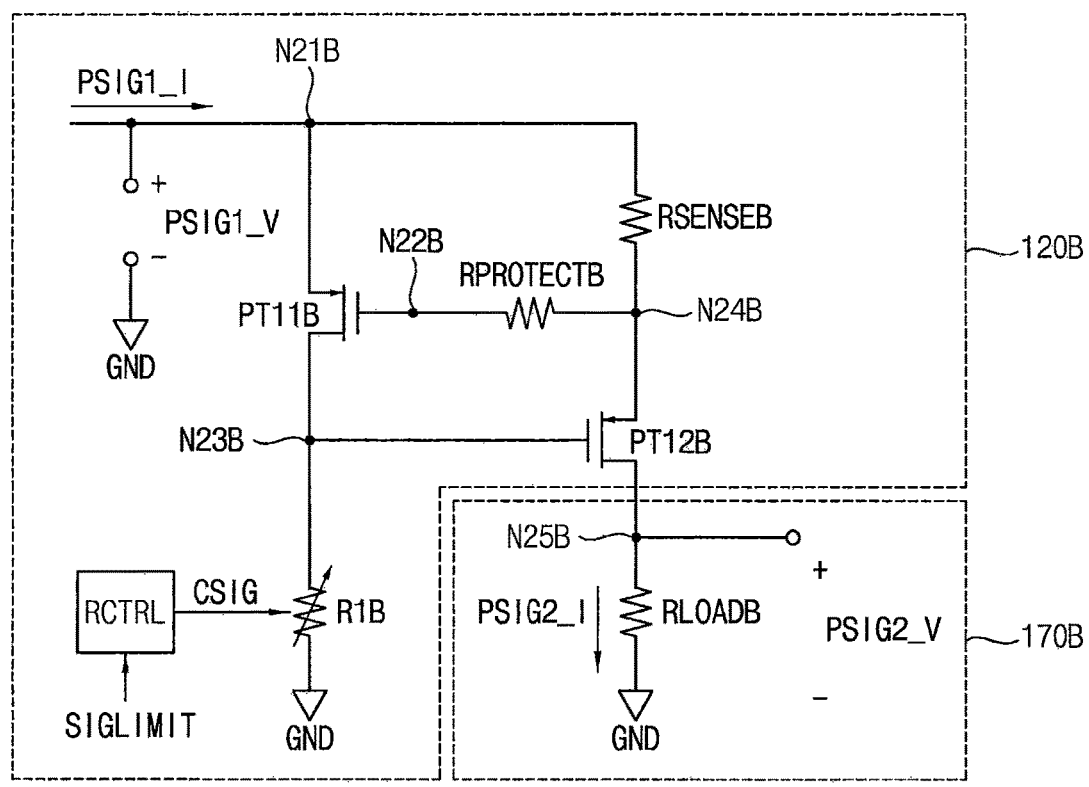

FIGS. 5A and 5B are circuit diagrams illustrating examples of the current clamper in the power circuit according to example embodiments.

Referring to FIG. 5A, a current clamper 120A is connected to a load stage 170A. The load stage 170A includes a load resistor RLOADA representing all loads connected to the switch circuit 130 and to a latter part connected to the switch circuit 130.

The current clamper 120A includes a first p-channel metal-oxide semiconductor (PMOS) transistor PT11A, a second PMOS transistor PT12A, a sensing resistor RSENSEA, a protection resistor RPROTECTA and a variable resistor R1A.

The first internal voltage PSIG1_V is a voltage of a first node N21A and the first internal current PSIG1_I is input to the first node N21A. The first PMOS transistor PT11A has a source connected to the first node N21A, a gate connected to a second node N22A and a drain connected to a third node N23A. The sensing resistor RSENSEA has a first terminal connected to the first node N21A and a second terminal connected to a fourth node N24A. The protection resistor RPROTECTA has a first terminal connected to the second node N22A and a second terminal connected to the fourth node N24A. The variable resistor R1A has a first terminal connected to the third node N23A and a second terminal connected to the ground voltage GND. The second PMOS transistor PT12A has a source connected to the fourth node N24A, a gate connected to the third node N23A and a drain connected to a fifth node N25A. The second internal voltage PSIG2_V is a voltage of the fifth node N25A and the second internal current PSIG2_I is output from the fifth node N25A through the load resister RLOADA.

A resistance of the variable resistor R1A may be varied by the limited current adjusting signal SIGLIMIT.

The second PMOS transistor PT12A may be turned-on or off in response to a voltage at the third node N23A. When the second PMOS transistor PT12A may be turned-on, the current clamper 120A outputs the first internal power signal PSIG1 as the second internal power signal PSIG2. Therefore, the second internal voltage PSIG2_V is the same as the first internal voltage PSIG1_V and the second internal current PSIG2_I is the same as the first internal current PSIG1_I.

When a magnitude of a current flowing through the sensing resistor RSENSEA exceeds a limited current amount, the first PMOS transistor PT11A is turned on, the second PMOS transistor PT12A is turned off, the second internal current PSIG2_I is limited to the limited current amount and the level of the second internal voltage PSIG2_V decreases. As the level of the second internal voltage PSIG2_V decreases, the power consumed in the current clamper 120A increases and a heat generated in the current clamper 120A increases. Therefore, in some embodiments, the magnitude of the first internal current PSIG1_I is maintained below the limited current amount. The protection resistor RPROTECTA protects the first PMOS transistor PT11A when a resistance of the load resistor RLOADA is relatively small.

Referring to FIG. 5B, a current clamper 120B is connected to a load stage 170B. The load stage 170B includes a load resistor RLOADB representing all loads connected to the switch circuit 130 and to a latter part of the switch circuit 130.

The current clamper 120B includes a first PMOS transistor PT11B, a second PMOS transistor PT12B, a sensing resistor RSENSEB, a protection resistor RPROTECTB, a variable resistor R1B and a resistance controller RCTRL.

The first internal voltage PSIG1_V is a voltage of a first node N21B and the first internal current PSIG1_I is input to the first node N21B. The first PMOS transistor PT11*b* has a source connected to the first node N21B, a gate connected to a second node N22B and a drain connected to a third node N23B. The sensing resistor RSENSEB has a first terminal connected to the first node N21B and a second terminal connected to a fourth node N24B. The protection resistor RPROTECTB has a first terminal connected to the second node N22B and a second terminal connected to the fourth node N24B. The variable resistor R1B has a first terminal connected to the third node N23B and a second terminal connected to the ground voltage GND. The second PMOS transistor PT12B has a source connected to the fourth node N24B, a gate connected to the third node N23B and a drain connected to a fifth node N25B. The second internal voltage PSIG2_V is a voltage at the fifth node N25B and the second internal current PSIG2_I is output from the fifth node N25B. The resistance controller RCTRL stores the limited current adjusting signal SIGLIMIT and adjusts a resistance of the variable resistance R1B based on the limited current adjusting signal SIGLIMIT.

The second PMOS transistor PT12B may be turned-on or off in response to a voltage of the third node N23B. When the second PMOS transistor PT12B may be turned-on, the current clamper 120B outputs the first internal power signal PSIG1 as the second internal power signal PSIG2. Therefore, the second internal voltage PSIG2_V is the same as the first internal voltage PSIG1_V and the second internal current PSIG2_V is the same as the first internal current PSIG1_I. When a magnitude of a current flowing through the sensing resistor RSENSEB exceeds a limited current amount, the first PMOS transistor PT11B is turned on, the second PMOS transistor PT12B is turned off, the second internal current PSIG2_I is limited to the limited current amount and the level of the second internal voltage PSIG2_V decreases. As the level of the second internal voltage PSIG2_V decreases, the power consumed in the current clamper 120B increases and a heat generated in the current clamper 12B increases. Therefore, in some embodiments, the magnitude of the first internal current PSIG1_I is maintained below the limited current amount. The protection resistor RPROTECTB protects the first PMOS transistor PT11B when a resistance of the load resistor RLOADB is relatively small.

Figure 6:
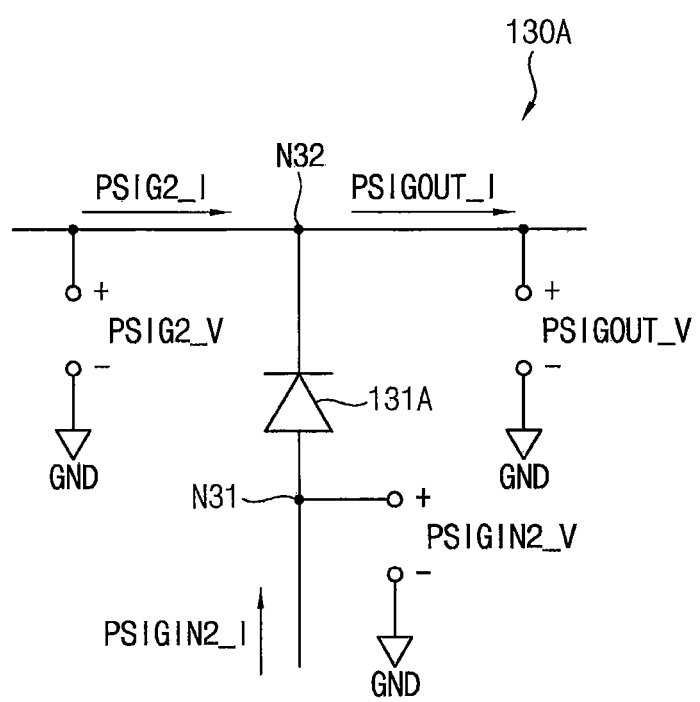
FIG. 6 is a circuit diagram illustrating an example of the switch circuit in the power circuit of FIG. 1 according to example embodiments.

FIG. 6 is a circuit diagram illustrating an example of the switch circuit in the power circuit of FIG. 1 according to example embodiments.

Referring to FIG. 6, a switch circuit 130A includes a diode 131A. The diode 131A has an anode connected to a first node N31 and a cathode connected to a second node N32. The second internal voltage PSIG2_V is a voltage at the second node N32 and the second internal current PSIG2_I is input to the second node N32. The second input voltage PSIGIN2_V is a voltage at the first node N31 and a second input current PSIGIN2_I of the second input power signal PSIGIN2 is input to the first node N31. An output voltage PSIGOUT_V of the output power signal PSIGOUT is a voltage at the second node N32 and an output current PSIGOUT_I of the output power signal PSIGOUT is output from the second node N32.

When the threshold voltage is a threshold voltage of the diode 131A, the switch circuit 130A operates as follows.

When the level of the second input voltage PSIGIN2_V is less than a level of the sum of the second internal voltage PSIG2_V and the threshold voltage, the switch circuit 130A outputs the second internal power signal PSIG2 as the output power signal PSIGOUT. When the level of the second input voltage PSIGIN2_V is equal to or greater than the level of the sum of the second internal voltage PSIG2_V and the threshold voltage as the magnitude of the first internal current PSIG1_I increases and the magnitude of the second internal voltage PSIG2_V decreases, the switch circuit 130A outputs the sum of the second input power signal PSIGIN2 and the second internal power signal PSIG2 as the output power signal PSIGOUT. When an amount of current required by the load stage exceeds the limited current amount, the switch circuit 130A generates the output current PSIGOUT_I by fixing the magnitude of the first internal current PSIG1_I to the limited current amount and summing the second input current PSIGIN2_I and the fixed first internal current PSIG1_I.

Figure 7:
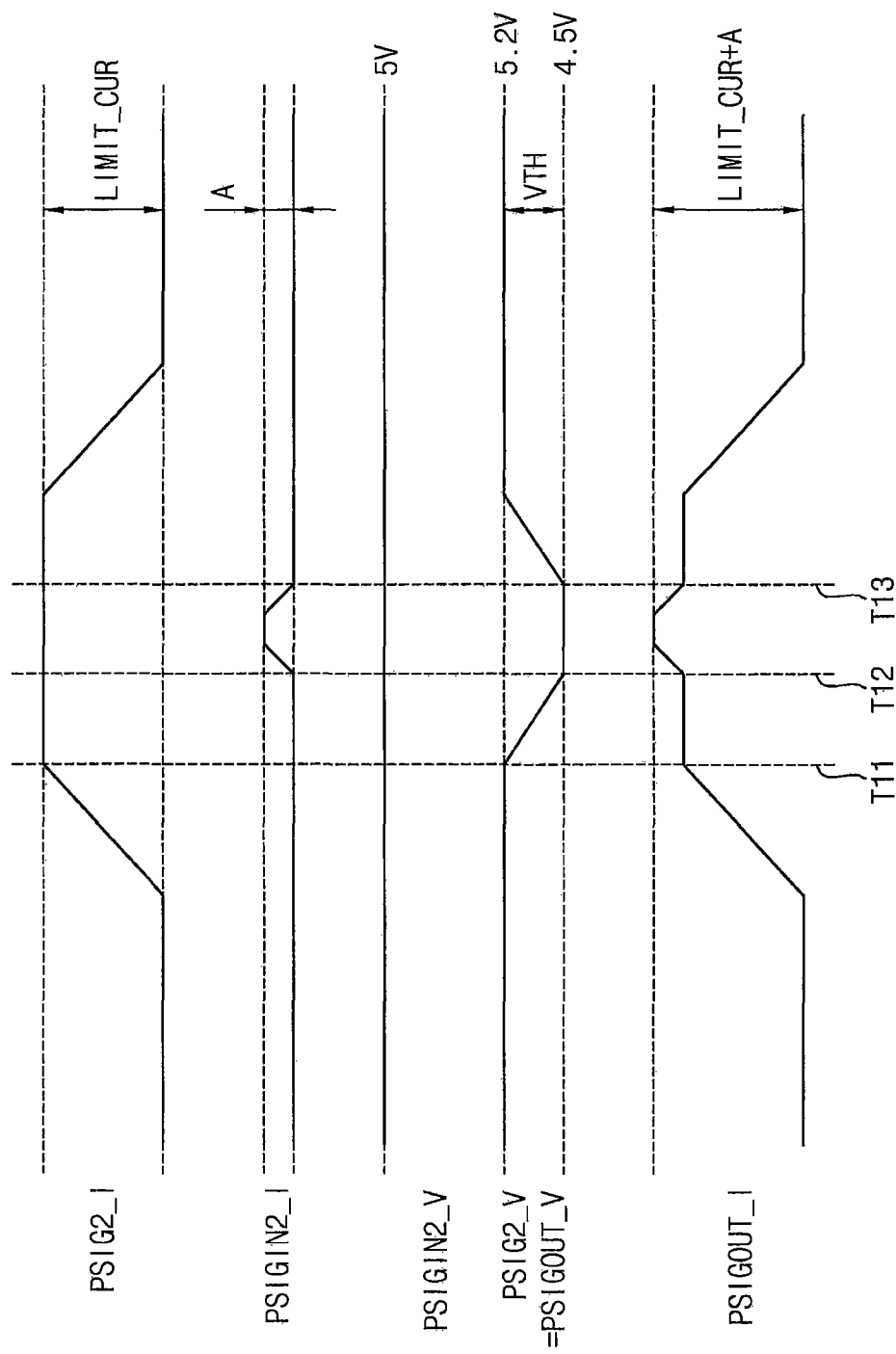
FIG. 7 is a timing diagram illustrating an operation of the power circuit of FIG. 1, which includes the switch circuit of FIG. 6.

FIG. 7 is a timing diagram illustrating an operation of the power circuit of FIG. 1, which includes the switch circuit of FIG. 6.

In FIG. 7, it is assumed that the first input voltage PSIGIN1_V corresponds to 12 [V], the first input voltage PSIGIN2_V corresponds to 5 [V], the offset voltage corresponds to 0.2 [V] and the threshold voltage of the diode 131A corresponds to 0.7[V].

The switch circuit 130A outputs the second internal power signal PSIG2 as the output power signal PSIGOUT until a time T11 when the magnitude of the second internal current PSIG2_I reaches the limited current amount LIMIT_CUR. Since the second internal current PSIG2_I reaches the limited current amount LIMIT_CUR at the time T11, the level of the second internal voltage PSIG2_V decreases until a time T12. The diode 131A is turned-on from the time T12 to a time T13, and the switch circuit 130A outputs the sum of the second input power signal PSIGIN2 and the second internal power signal PSIG2 as the output power signal PSIGOUT which having the output current PSIGOUT_I corresponding to the sum of the limited current amount LIMIT_CUR and the second input current A.

Figure 8:
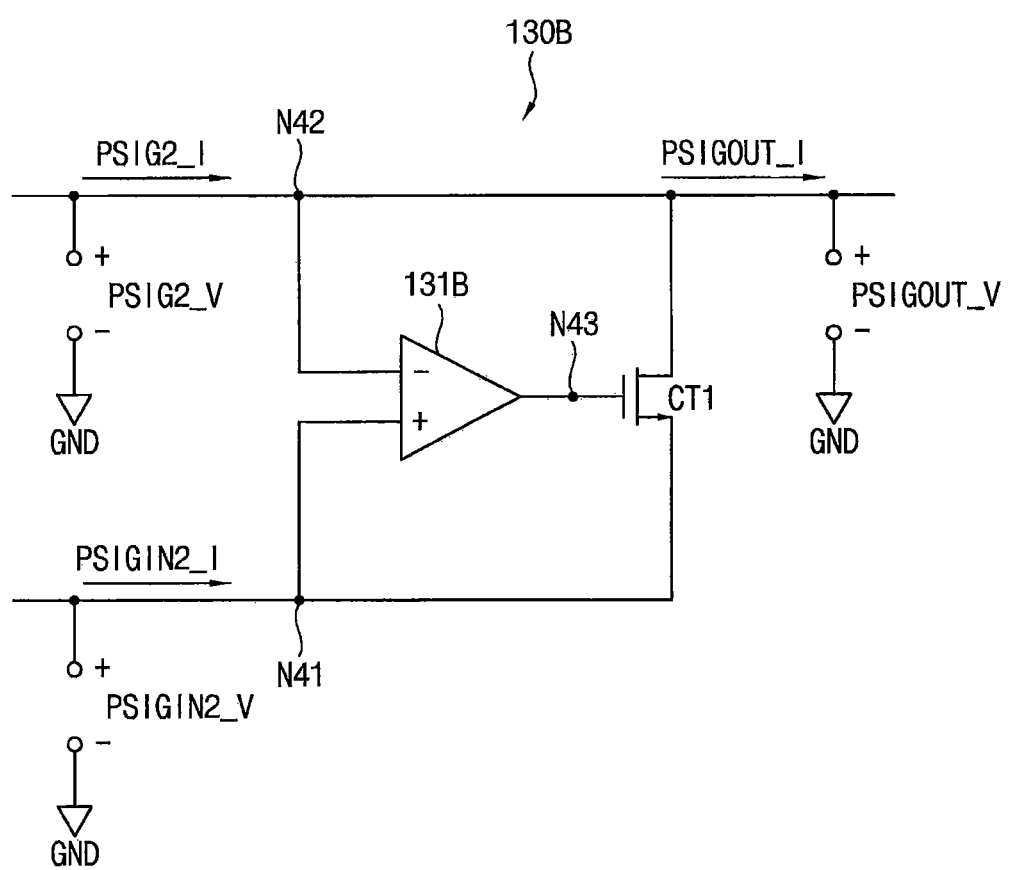
FIG. 8 is a circuit diagram illustrating an example of the switch circuit in the power circuit of FIG. 1 according to example embodiments.

FIG. 8 is a circuit diagram illustrating an example of the switch circuit in the power circuit of FIG. 1 according to example embodiments.

Referring to FIG. 8, a switch circuit 130B includes an operational amplifier 131B and an adjusting transistor CT1. The operational amplifier 131B has a first (positive) input terminal connected to a first node N41, a second (negative) input terminal connected to a second node N42 and an output terminal connected to a third node N43. The adjusting transistor CT1 has a drain connected to the second node N42, a gate connected to the third node N43 and a source connected to the first node N41. The second internal voltage PSIG2_V is a voltage at the second node N42 and the second internal current PSIG2_I is input to the second node N42. The second input voltage PSIGIN2_V is a voltage at the first node N41 and a second input current PSIGIN2_I of the second input power signal PSIGIN2 is input to the first node N41. An output voltage PSIGOUT_V of the output power signal PSIGOUT is a voltage at the second node N42 and an output current PSIGOUT_I of the output power signal PSIGOUT is output from the second node N42.

When the level of the second input voltage PSIGIN2_V is less than the level of the second internal voltage PSIG2_V, the switch circuit 130B outputs the second internal power signal PSIG2 as the output power signal PSIGOUT. When the second input voltage PSIGIN2_V is equal to or greater than the level of the second internal voltage PSIG2_V as the level of the second input voltage PSIGIN2_V, the adjusting transistor CT1 is turned-on and the switch circuit 130B outputs the sum of the second input power signal PSIGIN2 and the second internal power signal PSIG2 as the output power signal PSIGOUT. When an amount of current required by the load stage exceeds the limited current amount, the switch circuit 130B generates the output current PSIGOUT_I by fixing the magnitude of the first internal current PSIG1_I to the limited current amount and summing the second input current PSIGIN2_I and the fixed first internal current PSIG1_I.

Figure 9:
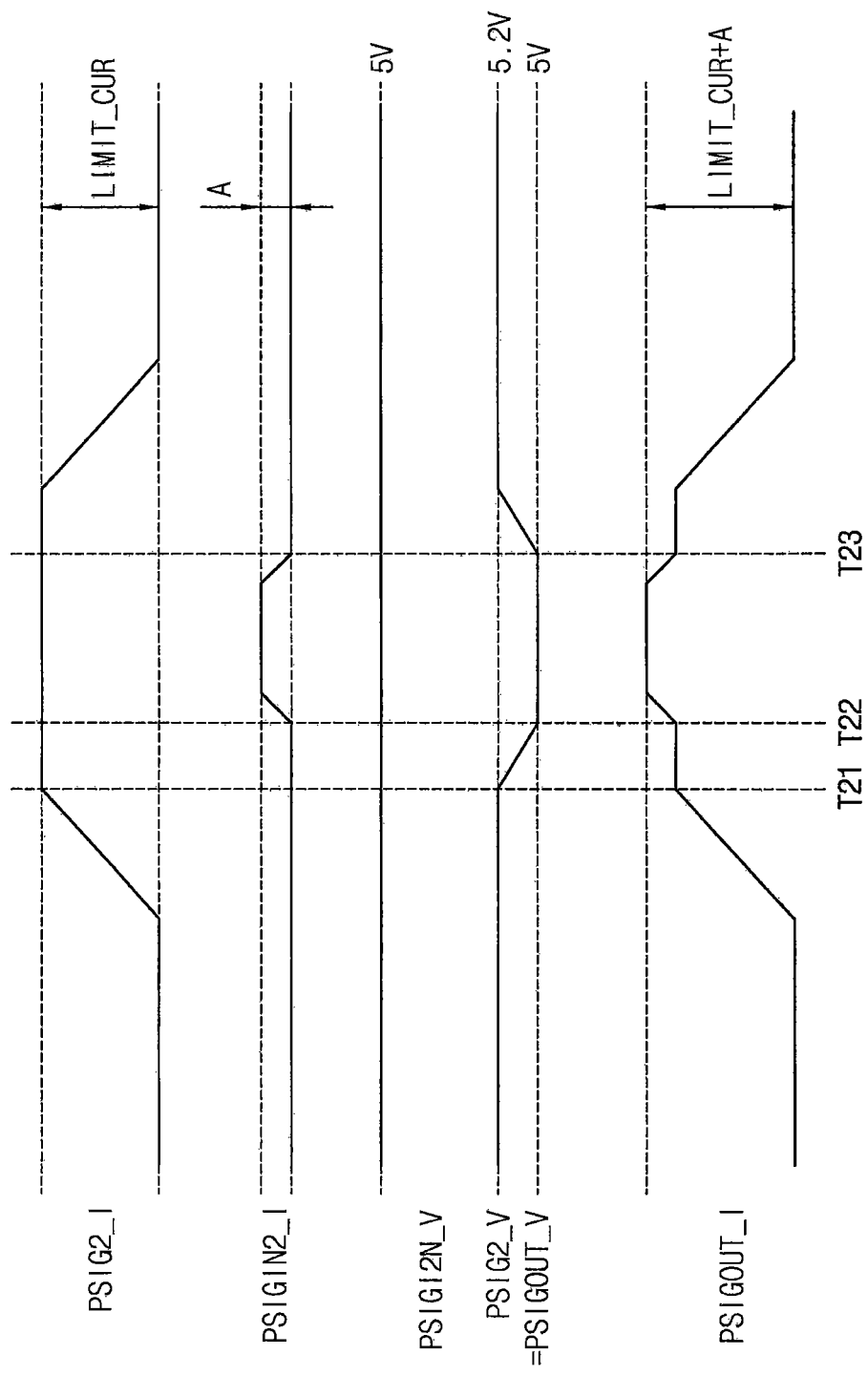
FIG. 9 is a timing diagram illustrating an operation of the power circuit of FIG. 1, which includes the switch circuit of FIG. 8.

FIG. 9 is a timing diagram illustrating an operation of the power circuit of FIG. 1, which includes the switch circuit of FIG. 8.

In FIG. 9, it is assumed that the first input voltage PSIGIN1_V corresponds to 12 [V], the first input voltage PSIGIN1_V corresponds to 5 [V] and the offset voltage corresponds to 0.2 [V].

The switch circuit 130B outputs the second internal power signal PSIG2 as the output power signal PSIGOUT until a time T21 when the magnitude of the second internal current PSIG2_I reaches the limited current amount LIMIT_CUR. Since the second internal current PSIG2_I reaches the limited current amount LIMIT_CUR at the time T21, the level of the second internal voltage PSIG2_V decreases until a time T22. The adjusting transistor 131B is turned-on from the time T22 to a time T23, and the switch circuit 130B outputs the sum of the second input power signal PSIGIN2 and the second internal power signal PSIG2 as the output power signal PSIGOUT which having the output current PSIGOUT_I corresponding to the sum of the limited current amount LIMIT_CUR and the second input current A.

Figure 10:
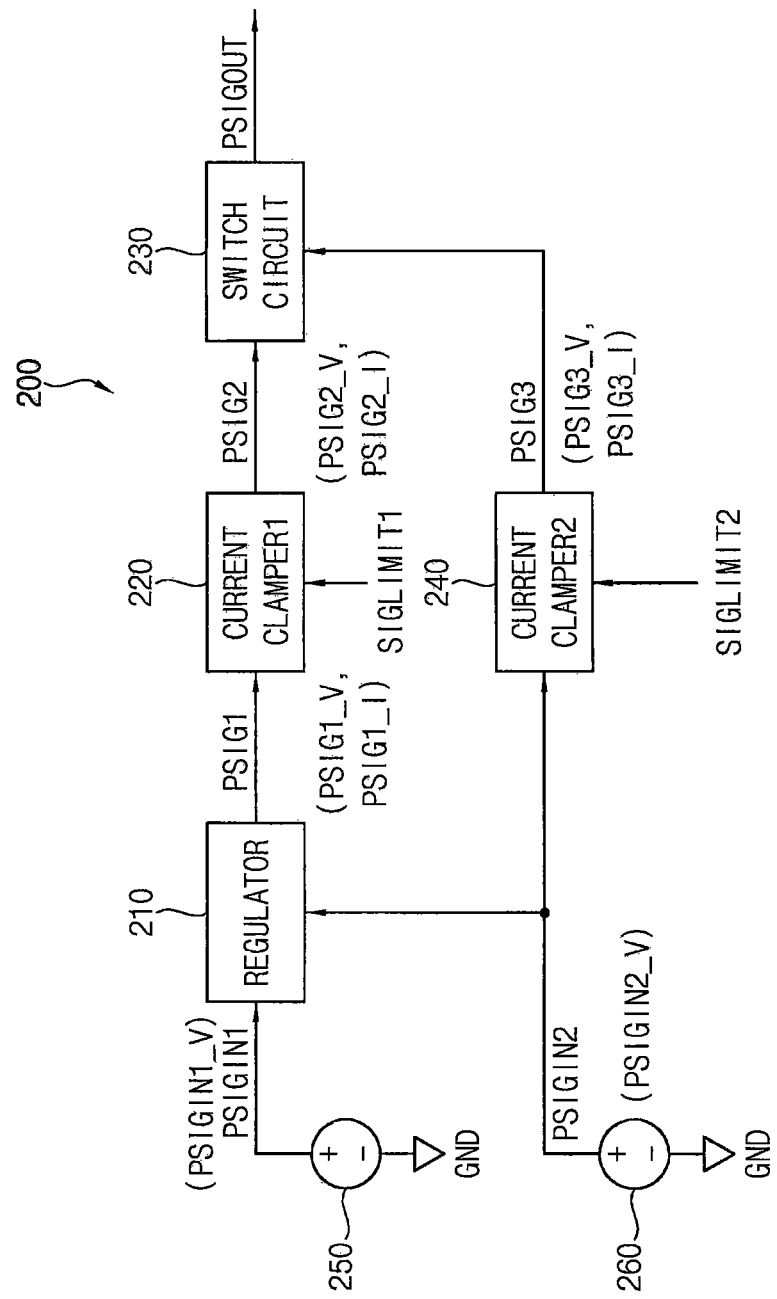
FIG. 10 is a block diagram illustrating a power circuit according to example embodiments.

FIG. 10 is a block diagram illustrating a power circuit according to example embodiments.

Referring to FIG. 10, a power circuit 200 includes a first power signal generator 250, a second power signal generator 260, a regulator 210, a first current clamper 220, a second current clamper 240 and a switch circuit 230.

The first power signal generator 250 generates a first input power signal PSIGIN1 having a first input voltage PSIGIN1_V. The second power signal generator 260 generates a second input power signal PSIGIN2 having a second input voltage PSIGIN2_V whose level is less than a level of the first input voltage PSIGIN1_V.

The regulator 210 generates a first internal power signal PSIG1 based on the first input voltage PSIGIN1_V. The first internal power signal PSIG1 may have a first internal current PSIG1_I and a first internal voltage PSIG1_V whose level is greater than the second input voltage PSIGIN2_V by an offset voltage. The first current clamper 220 clamps the first internal power signal PSIG1 based on a first limited current amount and generates a second internal power signal PSIG2 having a second internal voltage PSIG2_V and a second internal current PSIG2_I. The second current clamper 240 clamps the second input power signal PSIGIN2 based on a second limited current amount and generates a third internal power signal PSIG3 having a third internal voltage PSIG3_V and a third internal current PSIG3_I. The switch circuit 230 outputs one of the second internal power signal PSIG2 and a sum of the second internal power signal PSIG2 and the third internal power signal PSIG3 as an output power signal PSIGOUT, based on a difference between the second internal voltage PSIG2_V and the third internal voltage PSIG3_V.

The first limited current amount may be adjusted by a first limited current adjusting signal SIGLIMIT1 and the second limited current amount may be adjusted by a second limited current adjusting signal SIGLIMIT2. The operation of the power circuit 200 may be well understood based on the description with reference to FIGS. 1 through 9, for example.

Figure 11:
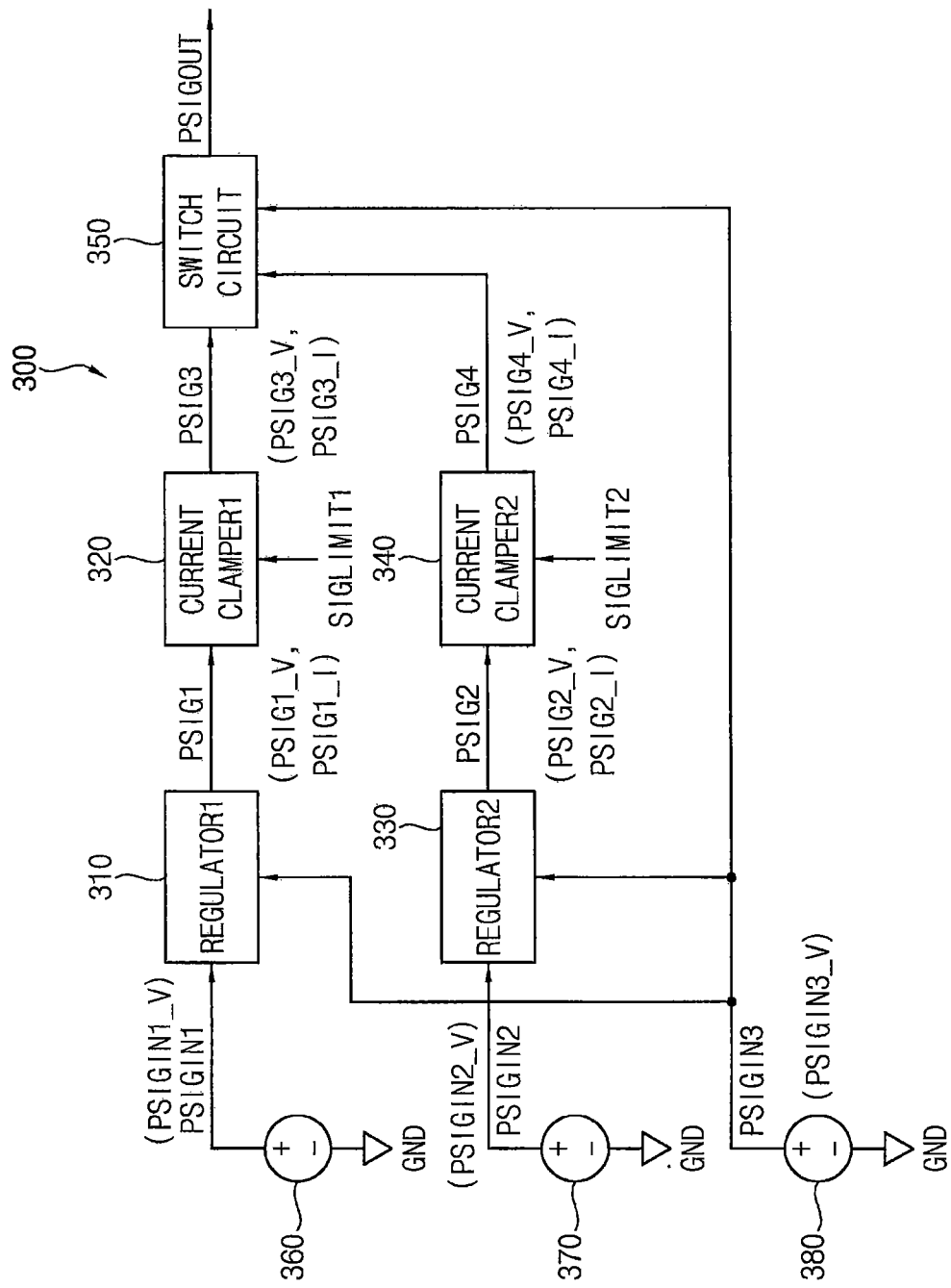
FIG. 11 is a block diagram illustrating a power circuit according to example embodiments.

FIG. 11 is a block diagram illustrating a power circuit according to example embodiments.

Referring to FIG. 11, a power circuit 300 includes a first power signal generator 360, a second power signal generator 370, a third power signal generator 380, a first regulator 310, a second regulator 330, a first current clamper 320, a second current clamper 340 and a switch circuit 350.

The first power signal generator 360 generates a first input power signal PSIGIN1 having a first input voltage PSIGIN1_V. The second power signal generator 370 generates a second input power signal PSIGIN2 having a second input voltage PSIGIN2_V whose level is less than a level of the first input voltage PSIGIN1_V. The third power signal generator 380 generates a third input power signal PSIGIN3 having a third input voltage PSIGIN3_V whose level is less than a level of the second input voltage PSIGIN2_V.

The first regulator 310 generates a first internal power signal PSIG1 based on the first input voltage PSIGIN1_V. The first internal power signal PSIG1 may have a first internal current PSIG1_I and a first internal voltage PSIG1_V whose level is greater than the third input voltage PSIGIN3_V by a first offset voltage. The second regulator 320 generates a second internal power signal PSIG2 based on the second input voltage PSIGIN2_V. The second internal power signal PSIG2 may have a second internal current PSIG2_I and a second internal voltage PSIG2_V whose level is greater than the third input voltage PSIGIN3_V by a second offset voltage.

The first current clamper 320 clamps the first internal power signal PSIG1 based on a first limited current amount and generates a third internal power signal PSIG3 having a third internal voltage PSIG3_V and a third internal current PSIG3_I. The second current clamper 340 clamps the second internal power signal PSIG2 based on a second limited current amount and generates a fourth internal power signal PSIG4 having a fourth internal voltage PSIG4_V and a fourth internal current PSIG4_I. The switch circuit 350 outputs the third internal power signal PSIG3, a sum of the third internal power signal PSIG3 and the fourth internal power signal PSIG4 or a sum of the third internal power signal PSIG3, the fourth internal power signal PSIG4 and the third input power signal PSIGIN3 as the output power signal PSIGOUT, based on a difference between the third internal voltage PSIG3_V, the fourth internal voltage PSIG4_V and the third input voltage PSIGIN3_V.

In example embodiments, a level of the first offset voltage is greater than a level of the second offset voltage.

In example embodiments, when the level of the third internal voltage PSIG3_V is greater than the level of the fourth internal voltage PSIG4_V, the switch circuit 350 outputs the third internal power signal PSIG3 as the output power signal PSIGOUT. When the level of the third internal voltage PSIG3_V is equal to the level of the fourth internal voltage PSIG4_V and the level of the third internal voltage PSIG3_V is greater than the level of the third input voltage PSIGIN3_V, the switch circuit 350 outputs the sum of the third internal power signal PSIG3 and the fourth internal power signal PSIG4 as the output power signal PSIGOUT. When the levels of the third internal voltage PSIG3_V, the fourth internal voltage PSIG4_V and the third input voltage PSIGIN3_V are the same, the switch circuit 350 outputs the sum of the third internal power signal PSIG3, the fourth internal power signal PSIG4 and the third input power signal PSIGIN3 as the output power signal PSIGOUT.

The first limited current amount may be adjusted by a first limited current adjusting signal SIGLIMIT1 and the second limited current amount may be adjusted by a second limited current adjusting signal SIGLIMIT2. The operation of the power circuit 300 may be well understood based on the description with reference to FIGS. 1 through 10, for example.

Figure 12:
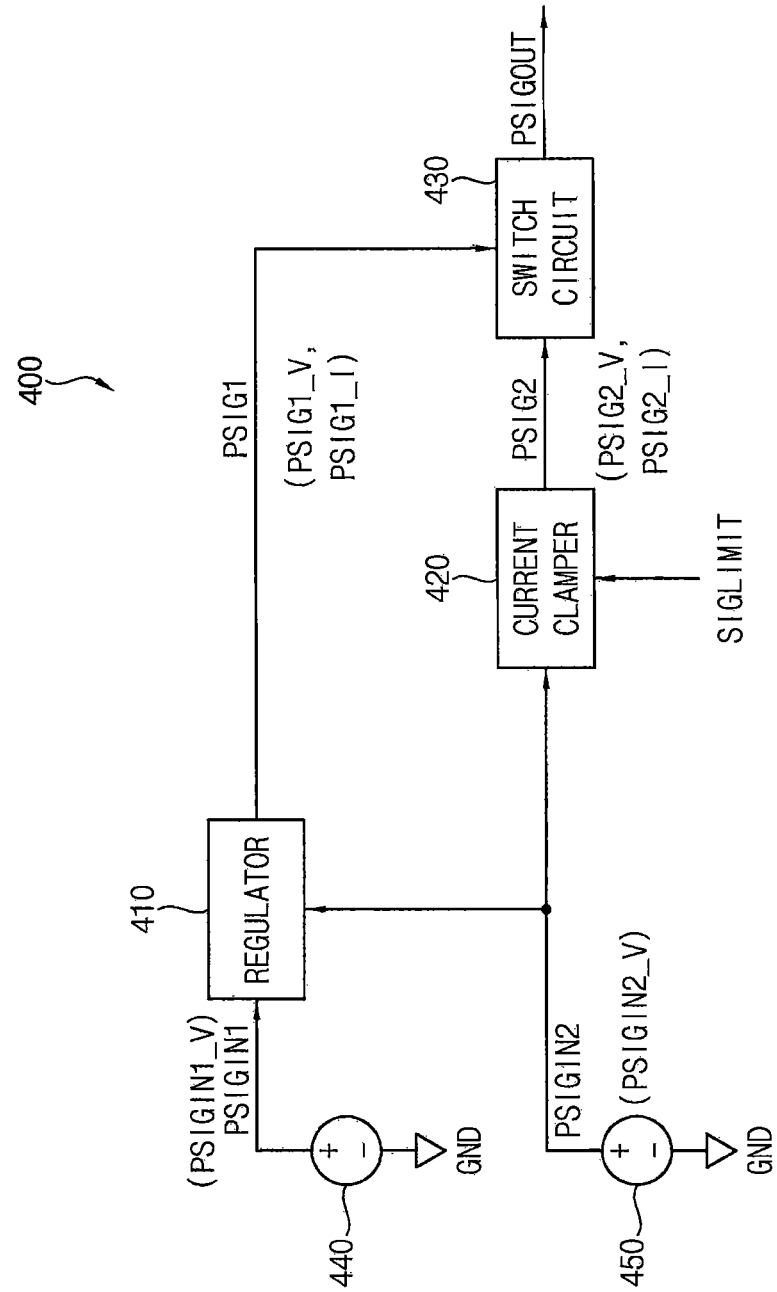
FIG. 12 is a block diagram illustrating a power circuit according to example embodiments.

FIG. 12 is a block diagram illustrating a power circuit according to example embodiments.

Referring to FIG. 12, a power circuit 400 includes a first power signal generator 440, a second power signal generator 450, a regulator 410, a current clamper 420 and a switch circuit 430.

The first power signal generator 440 generates a first input power signal PSIGIN1 having a first input voltage PSIGIN1_V. The second power signal generator 450 generates a second input power signal PSIGIN2 having a second input voltage PSIGIN2_V whose level is less than a level of the first input voltage PSIGIN1_V.

The regulator 410 generates a first internal power signal PSIG1 based on the first input voltage PSIGIN1_V. The first internal power signal PSIG1 may have a first internal current PSIG1_I and a first internal voltage PSIG1_V whose level is greater than the second input voltage PSIGIN2_V by an offset voltage. The current clamper 420 clamps second input power signal PSIGIN2 based on a limited current amount and generates a second internal power signal PSIG2 having a second internal voltage PSIG2_V and a second internal current PSIG2_I. The switch circuit 430 outputs one of the second internal power signal PSIG2 and a sum of the first internal power signal PSIG1 and the second internal power signal PSIG2 as an output power signal PSIGOUT, based on a difference between the first internal voltage PSIG1_V and the second internal voltage PSIG2_V.

In example embodiments, when the level of the first internal voltage PSIG1_V is less than the level of the second internal voltage PSIG2_V, the switch circuit 430 outputs the second internal power signal PSIG2 as the output power signal PSIGOUT. When the level of the first internal voltage PSIG1_V is equal to or greater than the level of the second internal voltage PSIG2_V, the switch circuit 430 outputs the sum of the first internal power signal PSIG1 and the second internal power signal PSIG2 as the output power signal PSIGOUT.

In some embodiments, when the level of the first internal voltage PSIG1_V is less than a level of a sum of the second internal voltage PSIG2_V and a threshold voltage, the switch circuit 400 outputs the second internal power signal PSIG2 as the output power signal PSIGOUT. When the level of the first internal voltage PSIG1_V is equal to or greater than the level of the sum of the second internal voltage PSIG2_V and the threshold voltage, the switch circuit 400 outputs the sum of the first internal power signal PSIG1 and the second internal power signal PSIG2 as the output power signal PSIGOUT.

The power circuit 100 of FIG. 1 uses the first input power signal PSIGIN1 preferentially to the second input power signal PSIGIN2 whereas the power circuit 400 of FIG. 12 uses the second input power signal PSIGIN2 preferentially to the first input power signal PSIGIN1.

Figure 13:
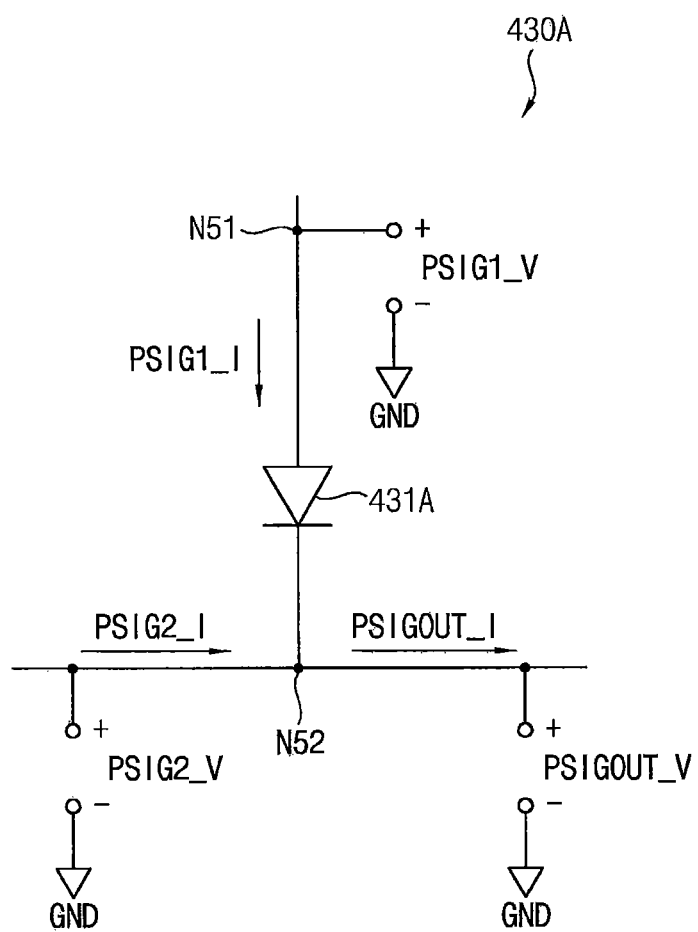
FIG. 13 is a circuit diagram illustrating an example of the switch circuit in the power circuit of FIG. 12 according to example embodiments.

FIG. 13 is a circuit diagram illustrating an example of the switch circuit in the power circuit of FIG. 12 according to example embodiments.

Referring to FIG. 13, a switch circuit 430A includes a diode 431A. The diode 431A has an anode connected to a first node N51 and a cathode connected to a second node N52. The second internal voltage PSIG2_V is a voltage of the second node N52 and the second internal current PSIG2_I is input to the second node N52. The first input voltage PSIGIN1_V is a voltage at the first node N51 and a first input current PSIGIN1_I of the first input power signal PSIGIN1 is input to the first node N51. An output voltage PSIGOUT_V of the output power signal PSIGOUT is a voltage of the second node N52 and an output current PSIGOUT_I of the output power signal PSIGOUT is output from the second node N52.

When the threshold voltage is a threshold voltage of the diode 431A, the switch circuit 430A operates as follows. When the level of the first input voltage PSIGN1_V is less than a level of the sum of the second internal voltage PSIG2_V and the threshold voltage, the diode 431A is turned off and the switch circuit 430A outputs the second internal power signal PSIG2 as the output power signal PSIGOUT. When the level of the first input voltage PSIGIN1_V is equal to or greater than the level of the sum of the second internal voltage PSIG2_V and the threshold voltage, as the magnitude of the second internal current PSIG2_I increases and the magnitude of the second internal voltage PSIG2_V decreases, the switch circuit 430A outputs the sum of the first internal power signal PSIG1 and the second internal power signal PSIG2 as the output power signal PSIGOUT.

Figure 14:
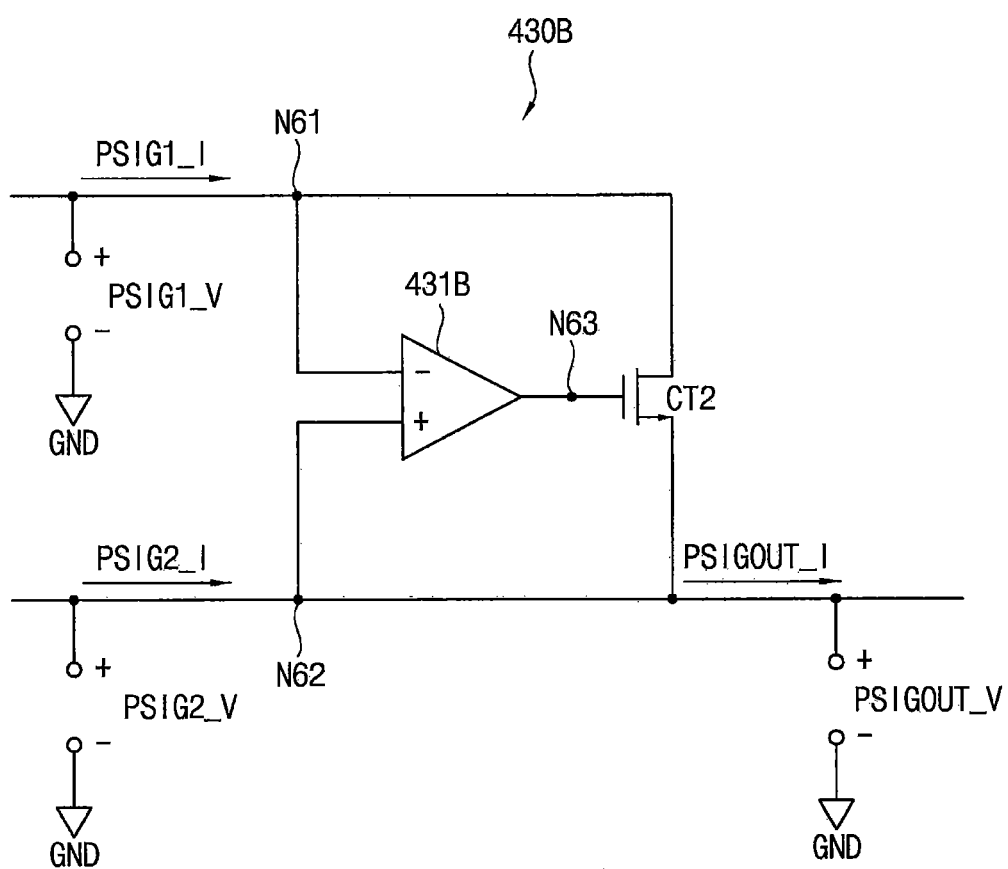
FIG. 14 is a circuit diagram illustrating an example of the switch circuit in the power circuit of FIG. 12 according to example embodiments.

FIG. 14 is a circuit diagram illustrating an example of the switch circuit in the power circuit of FIG. 12 according to example embodiments.

Referring to FIG. 14, a switch circuit 430B includes an operational amplifier 431B and an adjusting transistor CT2. The operational amplifier 431B has a first (negative) input terminal connected to a first node N61, a second (positive) input terminal connected to a second node N62 and an output terminal connected to a third node N63. The adjusting transistor CT2 has a drain connected to the first node N61, a gate connected to the third node N63 and a source connected to the second node N62. The second internal voltage PSIG2_V is a voltage at of the second node N62 and the second internal current PSIG2_I is input to the second node N62. The first internal voltage PSIG1_V is a voltage at the first node N61 and the first internal current PSIG1_I is input to the first node N61. An output voltage PSIGOUT_V of the output power signal PSIGOUT is a voltage at the second node N62 and an output current PSIGOUT_I of the output power signal PSIGOUT is output from the second node N62.

When the level of the first internal voltage PSIG1_V is less than the level of the second internal voltage PSIG2_V, the switch circuit 430B outputs the second internal power signal PSIG2 as the output power signal PSIGOUT. When the first internal voltage PSIG1_V is equal to or greater than the level of the second internal voltage PSIG2_V, the adjusting transistor CT2 is turned-on and the switch circuit 440B outputs the sum of the first internal power signal PSIG1 and the second internal power signal PSIG2 as the output power signal PSIGOUT.

Figure 15:
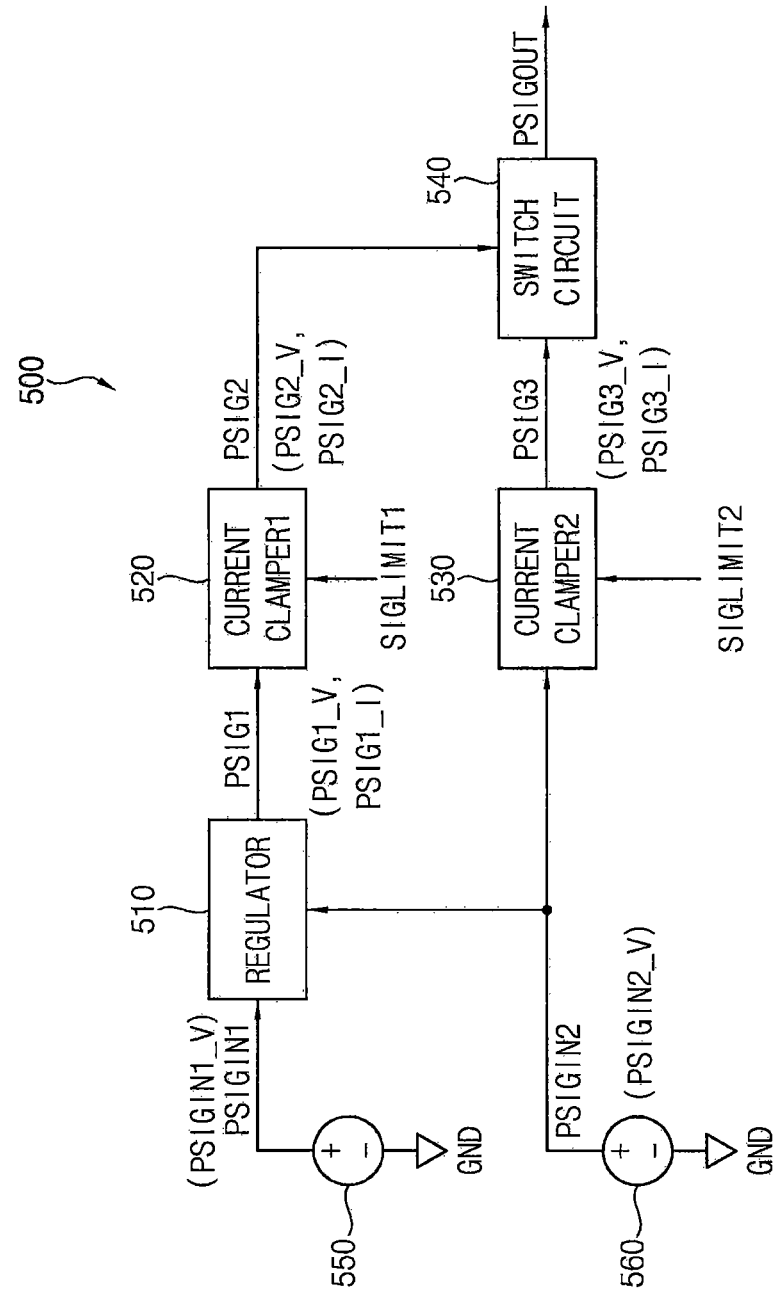
FIG. 15 is a block diagram illustrating a power circuit according to example embodiments.

FIG. 15 is a block diagram illustrating a power circuit according to example embodiments.

Referring to FIG. 15, a power circuit 500 includes a first power signal generator 550, a second power signal generator 560, a regulator 510, a first current clamper 520, a second current clamper 530 and a switch circuit 540.

The first power signal generator 550 generates a first input power signal PSIGIN1 having a first input voltage PSIGIN1_V. The second power signal generator 560 generates a second input power signal PSIGIN2 having a second input voltage PSIGIN2_V whose level is less than a level of the first input voltage PSIGIN1_V.

The regulator 510 generates a first internal power signal SPIG1 based on the first input voltage PSIGIN1_V. The first internal power signal PSIG1 may have a first internal current PSIG1_I and a first internal voltage PSIG1_V whose level is greater than the second input voltage PSIGIN2_V by an offset voltage. The first current clamper 520 clamps the first internal power signal PSIG1 based on a first limited current amount and generates a second internal power signal PSIG2 having a second internal voltage PSIG2_V and a second internal current PSIG2_I. The second current clamper 530 clamps the second input power signal PSIGIN2 based on a second limited current amount and generates a third internal power signal PSIG3 having a third internal voltage PSIG3_V and a third internal current PSIG3_I. The switch circuit 540 outputs one of the third internal power signal PSIG3 and a sum of the second internal power signal PSIG2 and the third internal power signal PSIG3 as an output power signal PSIGOUT, based on a difference between the second internal voltage PSIG2_V and the third internal voltage PSIG3_V.

The first limited current amount may be adjusted by a first limited current adjusting signal SIGLIMIT1 and the second limited current amount may be adjusted by a second limited current adjusting signal SIGLIMIT2. The operation of the power circuit 500 may be understood based on the description with reference to FIGS. 1 through 14, for example.

Figure 16:
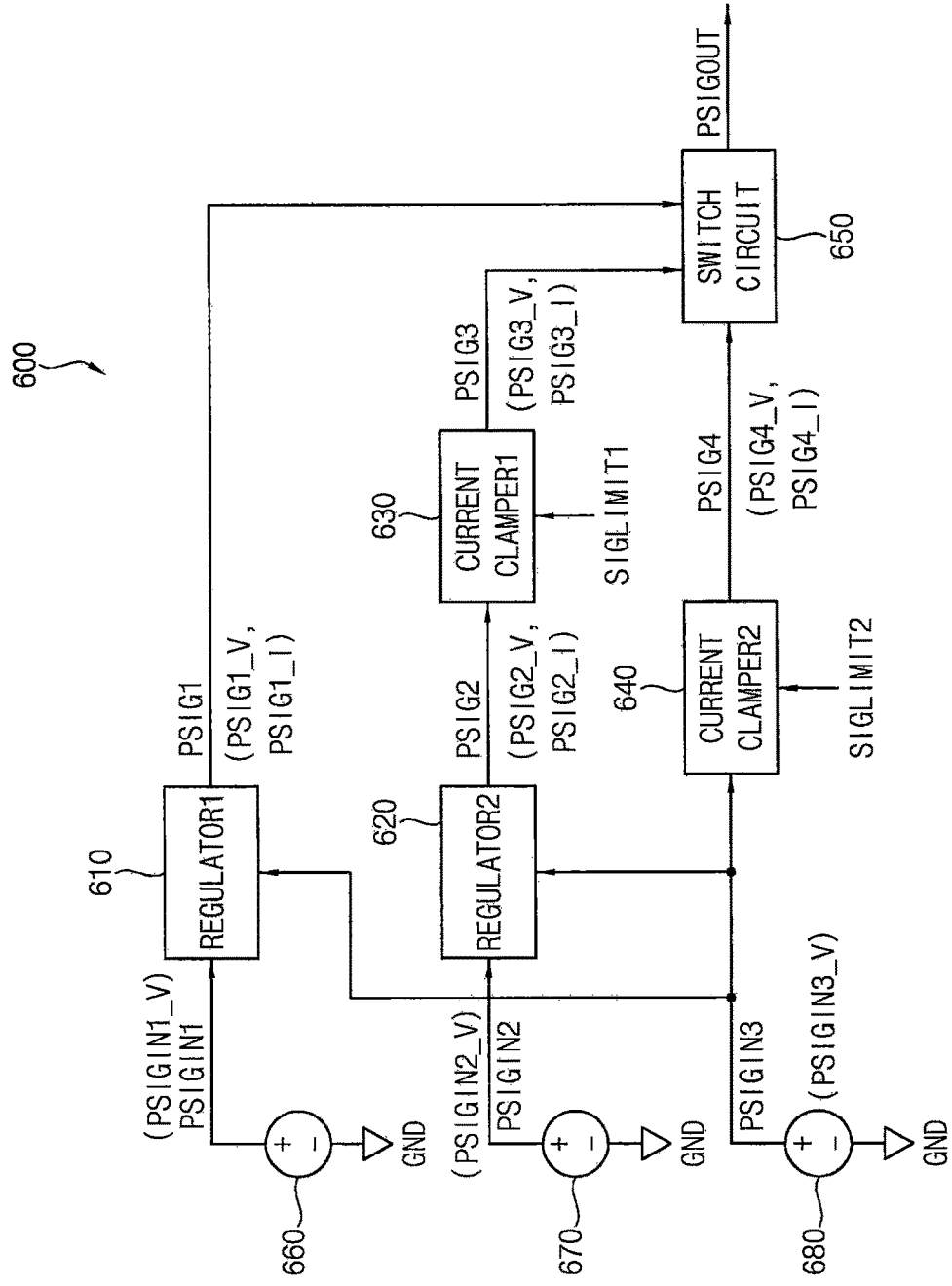
FIG. 16 is a block diagram illustrating a power circuit according to example embodiments.

FIG. 16 is a block diagram illustrating a power circuit according to example embodiments.

Referring to FIG. 16, a power circuit 600 includes a first power signal generator 660, a second power signal generator 670, a third power signal generator 680, a first regulator 610, a second regulator 620, a first current clamper 630, a second current clamper 640 and a switch circuit 650.

The first power signal generator 660 generates a first input power signal PSIGIN1 having a first input voltage PSIGIN1_V. The second power signal generator 670 generates a second input power signal PSIGIN2 having a second input voltage PSIGIN2_V whose level is less than a level of the first input voltage PSIGIN1_V. The third power signal generator 680 generates a third input power signal PSIGIN3 having a third input voltage PSIGIN3_V whose level is less than a level of the second input voltage PSIGIN2_V.

The first regulator 610 generates a first internal power signal PSIG1 based on the first input voltage PSIGIN1_V. The first internal power signal PSIG1 may have a first internal current PSIG1_I and a first internal voltage PSIG1_V whose level is greater than the third input voltage PSIGIN3_V by a first offset voltage. The second regulator 620 generates a second internal power signal PSIG2 based on the second input voltage PSIGIN2_V. The second internal power signal PSIG2 may have a second internal current PSIG2_I and a second internal voltage PSIG2_V whose level is greater than the third input voltage PSIGIN3_V by a second offset voltage.

The first current clamper 630 clamps the second internal power signal PSIG2 based on a first limited current amount and generates a third internal power signal PSIG3 having a third internal voltage PSIG3_V and a third internal current PSIG3_I. The second current clamper 640 clamps the third input power signal PSIGIN3 based on a second limited current amount and generates a fourth internal power signal PSIG4 having a fourth internal voltage PSIG4_V and a fourth internal current PSIG4_I. The switch circuit 650 outputs one of the first internal power signal PSIG1, a sum of the first internal power signal PSIG1 and the third internal power signal PSIG3 and a sum of the first internal power signal PSIG1, the third internal power signal PSIG3 and the fourth internal power signal PSIG4 as the output power signal PSIGOUT, based on a difference between the first internal voltage PSIG1_V, the third internal voltage PSIG3_V and the fourth internal voltage PSIG4_V.

In example embodiments, a level of the first offset voltage is greater than a level of the second offset voltage.

The first limited current amount may be adjusted by a first limited current adjusting signal SIGLIMIT1 and the second limited current amount may be adjusted by a second limited current adjusting signal SIGLIMIT2. The operation of the power circuit 600 may be understood based on the description with reference to FIGS. 1 through 15, for example.

Figure 17:
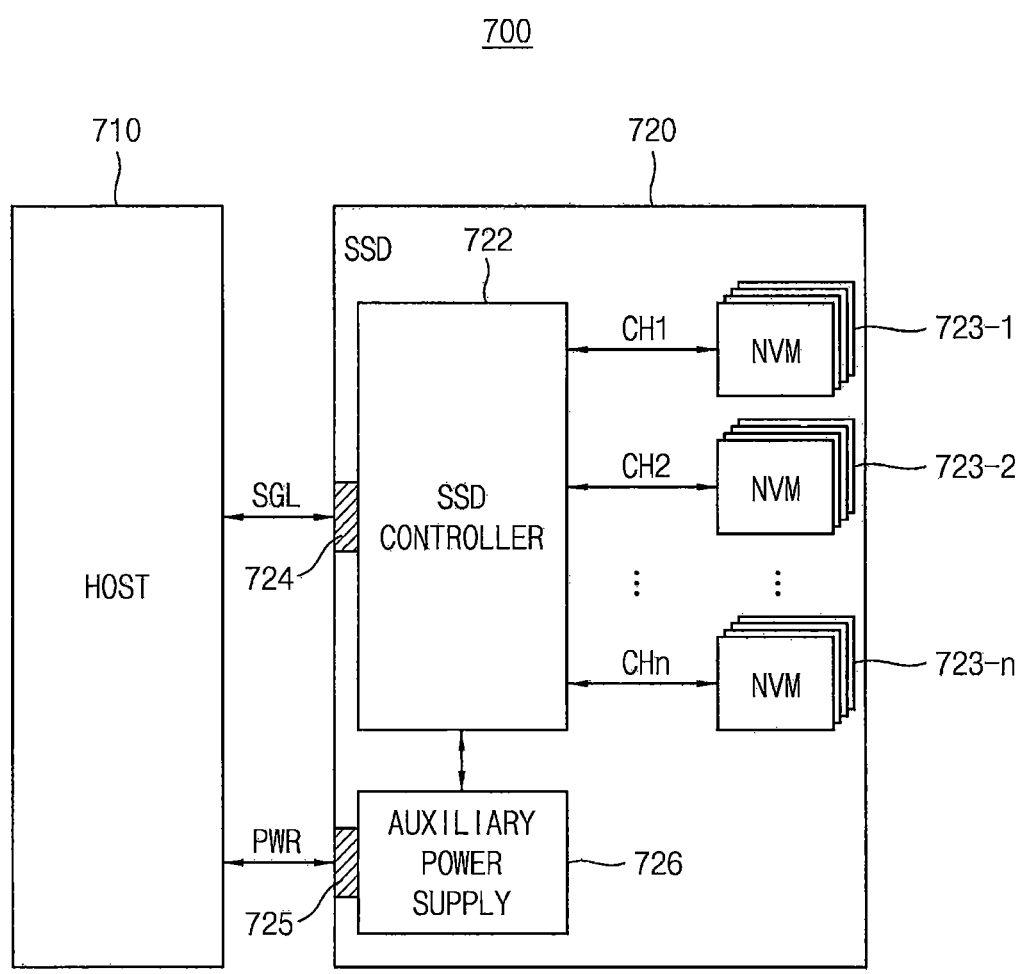
FIG. 17 is a block diagram illustrating a solid state drive (SSD) system according to example embodiments.

FIG. 17 is a block diagram illustrating a solid state drive (SSD) system according to example embodiments.

Referring to FIG. 17, an SSD system 700 includes a host 710 and an SSD 720. The SSD 720 includes first through n-th non-volatile memory devices 723-1, 723-2, ..., 723-n and a SSD controller 722. Here, n represents an integer greater than or equal to 2. The first through n-th non-volatile memory devices 723-1, 723-2, ..., 723-n may be used as a storage medium of the SSD 720.

Each of the first through n-th non-volatile memory devices 723-1, 723-2, ..., 723-n may include a memory cell array formed on a substrate with a three-dimensional structure. Memory cells included in the memory cell array may be formed in a direction perpendicular to the substrate. The memory cells included in the memory cell array may be connected to a plurality of word lines, which are stacked in a direction perpendicular to the substrate, and a plurality of bit lines, which are formed in a direction parallel to the substrate.

The SSD controller 722 is coupled to the first through n-th non-volatile memory devices 723-1, 723-2, ..., 723-n through first to n-th channels CH1, CH2, ... CHn, respectively.

The SSD controller 722 exchanges a signal SGL with the host 710 through a signal connector 724. The signal SGL may include a command, an address and data. The SSD controller 722 may perform a program operation and a read operation on the first through n-th non-volatile memory devices 723-1, 723-2, ..., 723-n according to the command received from the host 710.

The SSD 720 may further include an auxiliary power supply 726. The auxiliary power supply 726 may receive power PWR from the host 710 through a power connector 725 and provide power to the SSD controller 722. The auxiliary power supply 726 may be placed inside or outside the SSD 720. For example, the auxiliary power supply 726 may be placed on a main board and provide auxiliary power to the SSD 720.

The auxiliary power supply 726 may include one of the power circuits 100, 200, 300, 400, 500 and 600 of respective FIGS. 1, 10, 11, 12, 15 and 16.

Figure 18:
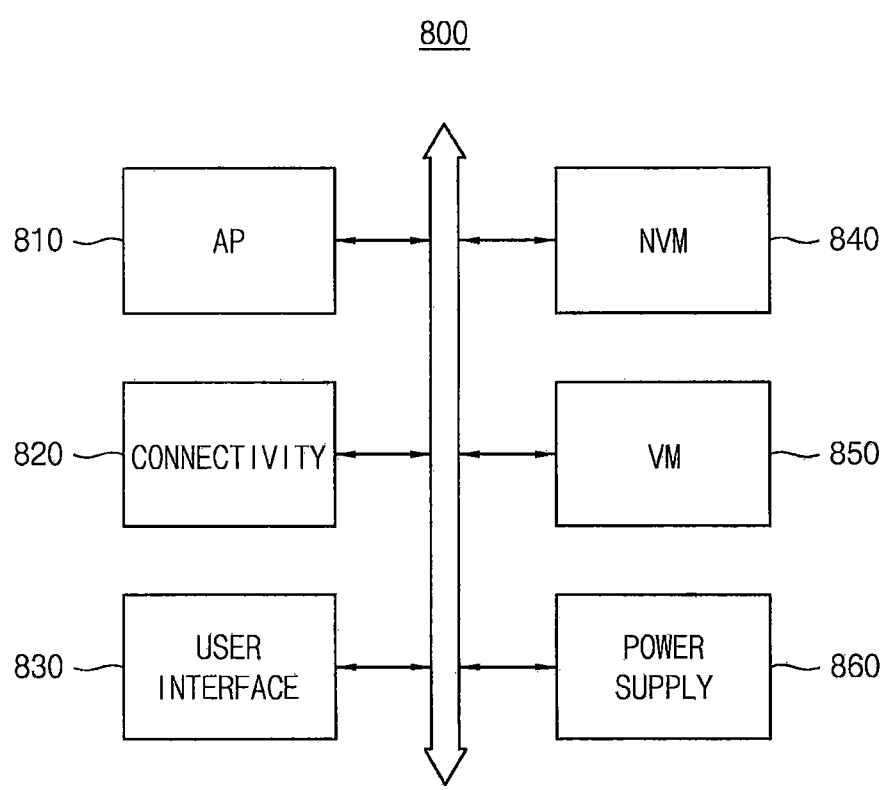
FIG. 18 is a block diagram illustrating a mobile system according to example embodiments.

FIG. 18 is a block diagram illustrating a mobile system according to example embodiments.

Referring to FIG. 18, a mobile system 800 includes an application processor (AP) 810, a connectivity unit 820, a user interface 830, a non-volatile memory device 840, a volatile memory device 850 and a power supply 860.

In some embodiments, the mobile system 800 may be a mobile phone, a smart phone, a personal digital assistant (PDA), a portable multimedia player (PMP), a digital camera, a music player, a portable game console, a navigation system, etc.

The application processor 810 may execute applications, such as a web browser, a game application, a video player, etc. In some example embodiments, the application processor 810 may include a single core or multiple cores. For example, the application processor 810 may be a multi-core processor, such as a dual-core processor, a quad-core processor, a hexa-core processor, etc. The application processor 810 may include an internal or external cache memory.

The connectivity unit 820 may perform wired or wireless communication with an external device. For example, the connectivity unit 820 may perform Ethernet communication, near field communication (NFC), radio frequency identification (RFID) communication, mobile telecommunication, memory card communication, universal serial bus (USB) communication, etc. In some embodiments, the connectivity unit 820 may include a baseband chipset that supports communications, such as global system for mobile communications (GSM), general packet radio service (GPRS), wideband code division multiple access (WCDMA), high speed downlink/uplink packet access (HSxPA), etc.

The non-volatile memory device 840 may store a boot image for booting the mobile system 800.

The non-volatile memory device 840 may include a memory cell array formed on a substrate in a three-dimensional structure. Memory cells included in the memory cell array may be formed in a direction perpendicular to the substrate. The memory cells included in the memory cell array may be connected to a plurality of word lines, which are stacked in a direction perpendicular to the substrate, and a plurality of bit lines, which are formed in a direction parallel to the substrate.

The volatile memory device 850 may store data processed by the application processor 810, or may operate as a working memory.

The user interface 830 may include at least one input device, such as a keypad, a touch screen, etc., and at least one output device, such as a speaker, a display device, etc.

The power supply 860 may supply an operating voltage to the mobile system 800. The power supply 860 may include one of the power circuits 100, 200, 300, 400, 500 and 600 of respective FIGS. 1, 10, 11, 12, 15 and 16.

In some embodiments, the mobile system 800 may further include an image processor, and/or a storage device, such as a memory card, a solid state drive (SSD), a hard disk drive (HDD), a CD-ROM, etc.

In some embodiments, the mobile system 800 and/or components of the mobile system 800 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

The present disclosure may be applied to various electronic devices including a regulator circuit. For example, the present disclosure may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed:

1. A power circuit comprising:
    a first power signal generator configured to generate a first input power signal having a first input voltage;
    a second power signal generator configured to generate a second input power signal having a second input voltage whose level is less than a level of the first input voltage;
    a regulator configured to generate a first internal power signal based on the first input voltage, the first internal power signal having a first internal current and a first internal voltage that is greater than the second input voltage by an offset voltage;
    a current clamper configured to clamp the first internal power signal based on a limited current amount and configured to generate a second internal power signal having a second internal voltage and a second internal current; and
    a switch circuit configured to output one of the second internal power signal and a sum of the second input power signal and the second internal power signal as an output power signal, based on a difference between the second internal voltage and the second input voltage.

2. The power circuit of claim 1, wherein when the level of the second input voltage is less than a level of the second internal voltage, the switch circuit is configured to output the second internal power signal as the output power signal, and is configured to output the sum of the second input power signal and the second internal power signal as the output power signal when the level of the second input voltage is equal to or greater than the level of the second internal voltage.

3. The power circuit of claim 1, wherein when the level of the second input voltage is less than a level of a sum of the second internal voltage and a threshold voltage, the switch circuit is configured to output the second internal power signal as the output power signal, and is configured to output the sum of the second input power signal and the second internal power signal as the output power signal when the level of the second input voltage is equal to or greater than the level of the sum of the second internal voltage and the threshold voltage.

4. The power circuit of claim 1, wherein the current clamper is configured to adjust the limited current amount responsive to a limited current adjusting signal.

5. The power circuit of claim 1, wherein when a magnitude of the first internal current is less than the limited current amount, the current clamper is configured to generate the second internal current having a magnitude equal to the magnitude of the first internal current and configured to generate the second internal voltage having a level that is equal to a level of the first internal voltage, and the current clamper is further configured to generate the second internal current having a magnitude that is equal to the limited current amount and the second internal voltage having a level that is less than the level of the first internal voltage when the magnitude of the first internal current is equal to or greater than the limited current amount.

6. The power circuit of claim 5, wherein when the magnitude of the first internal current is equal to or greater than the limited current amount, the level of the second internal voltage decreases as the magnitude of the first internal current increases.

7. The power circuit of claim 1, wherein the regulator comprises an operational amplifier, a power transistor and first through fourth resistors,
    the first resistor has a first terminal receiving the second input voltage and a second terminal connected to a first node,
    the second resistor has a first terminal connected to the first node and a second terminal connected to a ground voltage,
    the operational amplifier has a first input terminal connected to the first node, a second input terminal connected to a second node and an output terminal connected to a third node,
    the power transistor has a source connected to the first input voltage, a gate connected to the third node and a drain connected to the third resistor,
    the third resistor has a first terminal connected to the drain of the power transistor and a second terminal connected to the second node,
    the fourth resistor has a first terminal connected to the second node and a second terminal connected to the ground voltage,
    the first internal voltage is a voltage at the second node and the first internal current is output from the second node.

8. The power circuit of claim 1, wherein the current clamper comprises a first p-channel metal-oxide semiconductor (PMOS) transistor, a second PMOS transistor, a sensing resistor, a protection resistor and a variable resistor,
    the first internal voltage is a voltage at a first node, the first internal current is input to the first node,
    the first PMOS transistor has a source connected to the first node, a gate connected to a second node and a drain connected to a third node,
    the sensing resistor has a first terminal connected to the first node and a second terminal connected to a fourth node,
    the protection resistor has a first terminal connected to the second node and a second terminal connected to the fourth node,
    the variable resistor has a first terminal connected to the third node and a second terminal connected to a ground voltage,
    the second PMOS transistor has a source connected to the fourth node, a gate connected to the third node and a drain connected to a fifth node,
    the second internal voltage is a voltage at the fifth node and the second internal current is output from the fifth node.

9. The power circuit of claim 8, wherein a resistance of the variable resistor is varied by a limited current adjusting signal.

10. The power circuit of claim 8, wherein the current clamper further comprises:

a resistance controller configured to store a limited current adjusting signal and adjust a resistance of the variable resistor based on the limited current adjusting signal.

11. The power circuit of claim 1, wherein the switch circuit comprises a diode,
- the diode has an anode connected to a first node and a cathode connected to a second node,
- the second internal voltage is a voltage of the second node, the second internal current is input to the second node,
- the second input voltage is a voltage of the first node, a second input current of the second input power signal is input to the first node,
- an output voltage of the output power signal is a voltage of the second node and an output current of the output power signal is output from the second node.

12. The power circuit of claim 1, wherein the switch circuit comprises an operational amplifier and an adjusting transistor,
- the operational amplifier has a first input terminal connected to a first node, a second input terminal connected to a second node and an output terminal connected to a third node,
- the adjusting transistor has a drain connected to the second node, a gate connected to the third node and a source connected to the first node,
- the second internal voltage is a voltage at the second node, the second internal current is input to the second node,
- the second input voltage is a voltage at the first node, a second input current of the second input power signal is input to the first node,
- an output voltage of the output power signal is a voltage at the second node and an output current of the output power signal is output from the second node.

* * * * *